(12) United States Patent
He et al.

(10) Patent No.: US 9,923,794 B2
(45) Date of Patent: Mar. 20, 2018

(54) METHOD, APPARATUS, AND SYSTEM FOR IDENTIFYING ABNORMAL IP DATA STREAM

(71) Applicant: Huawei Technologies Co., Ltd., Shenzhen (CN)

(72) Inventors: Cheng He, Shenzhen (CN); Qun Huang, Hong Kong (HK); Pak-Ching Lee, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 14/798,811

(22) Filed: Jul. 14, 2015

(65) Prior Publication Data

US 2015/0319069 A1 Nov. 5, 2015

Related U.S. Application Data

(63) Continuation of application No. PCT/CN2014/089939, filed on Oct. 30, 2014.

(30) Foreign Application Priority Data

Apr. 28, 2014 (CN) .......................... 2014 1 0175828

(51) Int. Cl.
G06F 15/173 (2006.01)
H04L 12/26 (2006.01)
H04L 29/06 (2006.01)

(52) U.S. Cl.
CPC ........ *H04L 43/0882* (2013.01); *H04L 43/026* (2013.01); *H04L 63/1441* (2013.01)

(58) Field of Classification Search
CPC .................................................. H04L 43/0882
(Continued)

(56) References Cited

U.S. PATENT DOCUMENTS 8,645,527 B1 2/2014 Lee et al.
9,622,019 B2 * 4/2017 Li ........................... H04L 41/12
(Continued)

FOREIGN PATENT DOCUMENTS

CN 1570903 A 1/2005
CN 101459560 A 6/2009
(Continued)

OTHER PUBLICATIONS

Liu, Y., et al., "A Fast Sketch for Aggregate Queries over High-Speed Network Traffic," The 31st Annual IEEE International Conference on Computer Communications: Mini-Conferences, 2012, pp. 2741-2745.
(Continued)

*Primary Examiner* — Kevin Bates
*Assistant Examiner* — Clarence McCray
(74) *Attorney, Agent, or Firm* — Conley Rose, P.C.

(57) ABSTRACT

A method, an apparatus, and a system for identifying an abnormal IP data stream, which are used to improve identification accuracy. The method provided by the embodiments of the present invention includes: receiving Y elements sent by a data collection node; mapping the Y elements to N buckets; acquiring a bucket in the N buckets as a target bucket; acquiring r upper traffic limits of a first object in r buckets within the current time interval, the first object is any object mapped to the target bucket; and identifying, according to a preset abnormal object type and the r upper traffic limits within the current time interval, whether the first object is an abnormal object, where the preset abnormal object type is a heavy hitter or a heavy changer.

29 Claims, 8 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2009/0006607 A1* | 1/2009 | Bu .................. | H04L 43/028 709/224 |
| 2009/0016234 A1* | 1/2009 | Duffield .............. | H04L 63/1458 370/252 |
| 2014/0344651 A1* | 11/2014 | Shastry ............... | H03M 13/353 714/782 |
| 2015/0207706 A1* | 7/2015 | Li .......................... | H04L 67/02 709/224 |

FOREIGN PATENT DOCUMENTS

| | | |
|---|---|---|
| CN | 102014075 A | 4/2011 |
| CN | 102130800 A | 7/2011 |
| CN | 103023801 A | 4/2013 |
| CN | 103491018 A | 1/2014 |
| CN | 103532776 A | 1/2014 |

OTHER PUBLICATIONS

Manjhi, A., et al., "Finding (recently) frequent items in distributed data streams," Carnegie Mellon, Computer Science Department, 2004, 28 pages.

Cormode, G., et al., "What's New: Finding Significant Differences in Network Data Streams," IEEE/ACM Transactions on Networking, vol. 13, No. 6, Dec. 2005, pp. 1219-1232.

Yi, K., et al., "Optimal Tracking of Distributed Heavy Hitters and Quantiles," Department of Computer Science and Engineering, Dec. 2008, 12 pages.

Schweller, R., et al., "Reversible Sketches: Enabling Monitoring and Analysis Over High-Speed Data Streams," IEEE/ACM Transactions on Networking, vol. 15, No. 5, Oct. 2007, pp. 1059-1072.

Bu, T., et al., "Sequential hashing: A flexible approach for unveiling significant patterns in high speed networks," Computer Networks 54, 2010, pp. 3309-3326.

Cormode, G., et al., "Sketching Streams Through the Net: Distributed Approximate Query Tracking," Proceedings of the 31st VLDB Conference, 2005, pp. 13-24.

Foreign Communication From a Counterpart Application, PCT Application No. PCT/CN2014/089939, International Search Report dated Feb. 9, 2015, 7 pages.

Foreign Communication From a Counterpart Application, PCT Application No. PCT/CN2014/089939, Written Opinion dated Feb. 9, 2015, 5 pages.

Machine Translation and Abstract of Chinese Publication No. CN1570903, Jan. 26, 2005, 16 pages.

Machine Translation and Abstract of Chinese Publication No. CN101459560, Jun. 17, 2009, 29 pages.

Machine Translation and Abstract of Chinese Publication No. CN103023801, Apr. 3, 2013, 12 pages.

Machine Translation and Abstract of Chinese Publication No. CN103491018, Jan. 1, 2014, 19 pages.

Foreign Communication From A Counterpart Application, Chinese Application No. 201410175828.0, Chinese Office Action dated Nov. 16, 2017, 5 pages.

* cited by examiner

METHOD, APPARATUS, AND SYSTEM FOR IDENTIFYING ABNORMAL IP DATA STREAM

CROSS-REFERENCE TO RELATED APPLICATIONS

This application is a continuation of International Application No. PCT/CN2014/089939, filed on Oct. 30, 2014, which claims priority to Chinese Patent Application No. 201410175828.0, filed on Apr. 28, 2014, both of which are hereby incorporated by reference in their entireties.

TECHNICAL FIELD

The present invention relates to the field of communications, and in particular, to a method, an apparatus, and a system for identifying an abnormal Internet Protocol (IP) data stream.

BACKGROUND

With a combination of the Internet and mobile broadband (MBB), and large-scale promotion and application of intelligent devices such as an intelligent terminal and a tablet computer, MBB data network traffic greatly increases. This also brings about a new problem, that is, various network anomalies occur frequently. The network anomalies include abnormal traffic, network attacks, viruses, and the like, and the abnormal traffic includes heavy hitters and heavy changers. This causes great negative effects to network utilization, network performance, and user experience, and also leads to risks such as key information leakage, and system and terminal damages.

In various network anomalies, a heavy hitter and a heavy changer are two most important types of network anomalies. The heavy hitter refers to a data stream that frequently occurs in a network, and is defined as a data stream having large overall traffic in this specification. The heavy changer refers to a data stream whose main features (including a size, a port number, a protocol number, and the like) change a lot within a given time period. An IP data stream object (referred to as an "object" in the following) is defined using a quintuple (including a source IP, a destination IP, a source port, a destination port, and a protocol number) of an IP packet.

Currently, a method for identifying abnormal network traffic includes: 1) a data collection node randomly sends collected elements for different objects to one or more work nodes, where a relationship between an object and an element may be represented as "element (object, value)", that is, "element (key, value)"; and the "value" included in the element may be a traffic value of the element, or information (such as a quantity of data packets included in the element) that can indicate a traffic value of the element; 2) the work node maps, according to a mapping algorithm, the received elements to a data structure table formed by multiple buckets, and when each time interval ends, reports, to a control node, total traffic of elements that are mapped to each bucket within the time interval, where elements for a same object are generally mapped to a same bucket; in addition, because there are a large quantity of objects, to save storage space occupied by the data structure table, different objects may be mapped to a same bucket; and 3) the control node aggregates information reported by each work node, and when total traffic of elements that are mapped to all buckets of objects of a category is greater than a threshold, identifies the objects of this category as heavy hitters, where the objects of this category refer to objects that are in a same work node and mapped to a same bucket.

In the foregoing method, when total traffic of elements that are mapped to all buckets of objects of a category is greater than a threshold, the objects of this category are considered as heavy hitters. However, a reason causing that the total traffic of the elements that are mapped to all buckets of objects of a category is greater than a threshold may be that the objects of this category are formed by many small-traffic objects. Therefore, when the foregoing method is used for identification, these small-traffic objects may be wrongly identified as heavy hitters, that is, identification accuracy of the foregoing method is low.

SUMMARY

Embodiments of the present invention provide a method, an apparatus, and a system for identifying an abnormal IP data stream, which are used to improve identification accuracy.

In order to achieve the foregoing objective, the following technical solutions are used in the embodiments of the present invention.

According to a first aspect, a method for identifying an abnormal IP data stream is provided, where the method is applied to a work node, and includes receiving, within a current time interval, Y elements sent by a data collection node, where Y is greater than or equal to 1, and Y is an integer; mapping the Y elements to N buckets according to a mapping algorithm, where N is greater than or equal to 1, and N is an integer; acquiring a bucket in the N buckets as a target bucket, where total traffic of all elements mapped to the bucket is greater than or equal to a first threshold; acquiring r upper traffic limits of a first object in r buckets within the current time interval, where the r buckets are buckets to which the first object is mapped, the first object is any object mapped to the target bucket, each bucket in the r buckets includes one upper traffic limit for the first object, r is greater than or equal to 1, and r is an integer; and identifying, according to a preset abnormal object type and the r upper traffic limits within the current time interval, whether the first object is an abnormal object, where the preset abnormal object type is a heavy hitter or a heavy changer.

With reference to the first aspect, in a first possible implementation manner, the preset abnormal object type is a heavy hitter, and the identifying, according to a preset abnormal object type and the r upper traffic limits within the current time interval, whether the first object is an abnormal object includes when r1 upper traffic limits in the r upper traffic limits within the current time interval are all greater than or equal to a second threshold, determining that the first object is a heavy hitter, where $r \geq r1 \geq 1$.

With reference to the first aspect or the first possible implementation manner of the first aspect, in a second possible implementation manner, the preset abnormal object type is a heavy changer; and the method further includes acquiring r upper traffic limits of the first object in the r buckets within a previous time interval of the current time interval, where the r buckets are buckets to which the first object is mapped; and the identifying, according to a preset abnormal object type and the r upper traffic limits within the current time interval, whether the first object is an abnormal object includes acquiring variations of the r upper traffic object limits according to the r upper traffic limits within the current time interval and the r upper traffic limits within the previous time interval; and, when variations of r2 upper traffic limits in the variations of the r upper traffic limits are all greater than or equal to a third threshold, determining that the first object is a heavy changer, where r≥r2≥1.

With reference to any one of the first aspect and the first possible implementation manner to the second possible implementation manner of the first aspect, in a third possible implementation manner, elements for the first object are distributed in d work nodes including the work node, where d is greater than or equal to 2, and d is an integer, the d work nodes obtain d abnormal object sets through identification, and each work node obtains one abnormal object set through identification; and after the identifying, according to a preset abnormal object type and the r upper traffic limits within the current time interval, whether the first object is an abnormal object, the method further includes receiving (d−1) abnormal object sets sent by the other (d−1) work nodes, and when d1 abnormal object sets in the d abnormal object sets all include the first object, determining that the first object is a target abnormal object, where d≥d1≥1; or, sending, to a control node, an abnormal object set obtained through identification by the work node, so that when d2 abnormal object sets in the d abnormal object sets all include the first object, the control node determines that the first object is a target abnormal object, where d≥d2≥1.

With reference to any one of the first aspect and the first possible implementation manner to the third possible implementation manner of the first aspect, in a fourth possible implementation manner, the mapping the Y elements to N buckets according to a mapping algorithm includes mapping any element for the first object in the Y elements to a first bucket according to the mapping algorithm, where the first bucket refers to any bucket to which the first object can be mapped according to the mapping algorithm; and the method further includes updating record information included in the first bucket, where the record information includes total traffic of all elements mapped to the first bucket and an auxiliary queue, and the auxiliary queue is used to determine an upper traffic limit, of each object mapped to the first bucket, in the first bucket.

With reference to the fourth possible implementation manner of the first aspect, in a fifth possible implementation manner, the auxiliary queue is formed by total object traffic of objects mapped to the first bucket, a first element includes a traffic value v of the first object, and the first element is an element for the first object; and the updating record information included in the first bucket includes, when the auxiliary queue includes total object traffic of the first object, adding v to a value of the total object traffic of the first object; or, when the auxiliary queue does not include total object traffic of the first object, adding the total object traffic of the first object to the auxiliary queue, and assigning v to the total object traffic of the first object.

With reference to the fourth possible implementation manner of the first aspect, in a sixth possible implementation manner, the auxiliary queue is formed by total object traffic of objects mapped to the first bucket, a first element includes a traffic value v of the first object, and the first element is an element for the first object; the record information further includes a maximum allowable capacity of the auxiliary queue; and the updating record information included in the first bucket includes, in a case in which a value of a current capacity of the auxiliary queue is less than a value of the maximum allowable capacity, when the auxiliary queue does not include total object traffic of the first object, adding the total object traffic of the first object to the auxiliary queue, and assigning v to the total object traffic of the first object.

With reference to the fifth possible implementation manner of the first aspect, in a seventh possible implementation manner, the record information further includes a maximum allowable capacity of the auxiliary queue, and a value of a current capacity of the auxiliary queue is greater than or equal to a value of the maximum allowable capacity of the auxiliary queue; and before the adding the total object traffic of the first object to the auxiliary queue, the method further includes, when the value of the maximum allowable capacity of the auxiliary queue meets a preset expansion condition, expanding storage space corresponding to the value of the maximum allowable capacity to storage space corresponding to a value of an expanded capacity, where the updating record information included in the first bucket further includes assigning the value of the expanded capacity to the maximum allowable capacity.

With reference to any one of the fourth possible implementation manner to the seventh possible implementation manner of the first aspect, in an eighth possible implementation manner, the auxiliary queue does not include total object traffic of the first object, the record information further includes a maximum allowable capacity of the auxiliary queue and an object traffic estimation error of the first bucket, a value of the maximum allowable capacity of the auxiliary queue does not meet a preset expansion condition, a first element includes a traffic value v of the first object, the first element is an element for the first object, and the object traffic estimation error of the first bucket is used to determine an upper traffic limit, of an object mapped to the first bucket, in the first bucket; and before the updating record information included in the first bucket, the method further includes determining a minimum value between v and a value of total object traffic of each object in the auxiliary queue, where the updating record information included in the first bucket includes subtracting the minimum value from the value of the total object traffic of each object in the auxiliary queue, and adding the minimum value to a value of the object traffic estimation error of the first bucket.

With reference to the eighth possible implementation manner of the first aspect, in a ninth possible implementation manner, when the auxiliary queue includes total object traffic having a value being zero, the updating record information included in the first bucket further includes deleting the total object traffic having a value being zero; adding the total object traffic of the first object to the auxiliary queue; and assigning v to the total object traffic of the first object.

With reference to the eighth possible implementation manner or the ninth possible implementation manner of the first aspect, in a tenth possible implementation manner, when the auxiliary queue does not include total object traffic having a value being zero, the method further includes deleting the first element.

With reference to the seventh possible implementation manner or the eighth possible implementation manner of the first aspect, in an eleventh possible implementation manner, the method further includes determining whether a value L of the maximum allowable capacity of the auxiliary queue meets the preset expansion condition, which includes determining a quantity k of rounds of current expansion; when $(k+1)(k+2)-1>L$, determining that the value of the maximum allowable capacity of the auxiliary queue meets the preset expansion condition; and when $(k+1)(k+2)-1≤L$, determining that the value of the maximum allowable capacity of the auxiliary queue does not meet the preset expansion condition, where the value of the expanded capacity is $(k+1)(k+2)-1$.

With reference to the eleventh possible implementation manner of the first aspect, in a twelfth possible implementation manner, the determining a quantity k of rounds of current expansion includes determining the quantity k of rounds of current expansion according to a formula $$k = \frac{W}{T},$$

where W refers to total traffic, of all elements mapped to the first bucket, obtained after the first element is mapped to the first bucket; T refers to a dynamic expansion parameter; when the preset abnormal object type is a heavy hitter, $T=\phi$; or, when the preset abnormal object type is a heavy changer, $T=\epsilon\phi$, where $\phi$ refers to a preset total object traffic threshold of the first object, $\epsilon$ is a constant, and $0<\epsilon\leq 1$.

With reference to the eighth possible implementation manner of the first aspect, in a thirteenth possible implementation manner, the first element is an element for the first object in the Y elements, and specifically is the last element for the first object; and the acquiring r upper traffic limits of a first object in r buckets within the current time interval, where the r buckets are buckets to which the first object is mapped, includes acquiring an upper traffic limit of the first object in the first bucket, which includes, when the total object traffic of the first object is in the auxiliary queue, using the value of the total object traffic of the first object as a lower traffic limit of the first object in the first bucket; and when the total object traffic of the first object is not in the auxiliary queue, using zero as a lower traffic limit of the first object in the first bucket; and using a sum of the lower traffic limit of the first object in the first bucket and the object traffic estimation error of the first bucket as the upper traffic limit of the first object in the first bucket.

According to a second aspect, a work node is provided, including a receiving unit configured to receive, within a current time interval, Y elements sent by a data collection node, where Y is greater than or equal to 1, and Y is an integer; a mapping unit configured to map the Y elements to N buckets according to a mapping algorithm, where N is greater than or equal to 1, and N is an integer; a first acquiring unit configured to acquire a bucket in the N buckets as a target bucket, where total traffic of all elements mapped to the bucket is greater than or equal to a first threshold; a second acquiring unit configured to acquire r upper traffic limits of a first object in r buckets within the current time interval, where the r buckets are buckets to which the first object is mapped, the first object is any object mapped to the target bucket, each bucket in the r buckets includes one upper traffic limit for the first object, r is greater than or equal to 1, and r is an integer; and an identifying unit configured to identify, according to a preset abnormal object type and the r upper traffic limits within the current time interval, whether the first object is an abnormal object, where the preset abnormal object type is a heavy hitter or a heavy changer.

With reference to the second aspect, in a first possible implementation manner, the preset abnormal object type is a heavy hitter; and the identifying unit is configured to, when r1 upper traffic limits in the r upper traffic limits within the current time interval are all greater than or equal to a second threshold, determine that the first object is a heavy hitter, where $r \geq r1 \geq 1$.

With reference to the second aspect or the first possible implementation manner of the second aspect, in a second possible implementation manner, the preset abnormal object type is a heavy changer, and the work node further includes a third acquiring unit configured to acquire r upper traffic limits of the first object in the r buckets within a previous time interval of the current time interval, where the r buckets are buckets to which the first object is mapped; where the identifying unit is configured to acquire variations of the r upper traffic limits according to the r upper traffic limits within the current time interval and the r upper traffic limits within the previous time interval; and when variations of r2 upper traffic limits in the variations of the r upper traffic limits are all greater than or equal to a third threshold, determine that the first object is a heavy changer, where $r \geq r2 \geq 1$.

With reference to any one of the second aspect and the first possible implementation manner to the second possible implementation manner of the second aspect, in a third possible implementation manner, elements for the first object are distributed in d work nodes including the work node, where d is greater than or equal to 2, and d is an integer, the d work nodes obtain d abnormal object sets through identification, and each work node obtains one abnormal object set through identification; and the receiving unit is further configured to receive (d−1) abnormal object sets sent by the other (d−1) work nodes, and when d1 abnormal object sets in the d abnormal object sets all include the first object, determine that the first object is a target abnormal object, where $d \geq d1 \geq 1$; or, the work node further includes a sending unit configured to send, to a control node, an abnormal object set obtained through identification by the work node, so that when d2 abnormal object sets in the d abnormal object sets all include the first object, the control node determines that the first object is a target abnormal object, where $d \geq d2 \geq 1$.

With reference to any one of the second aspect and the first possible implementation manner to the third possible implementation manner of the second aspect, in a fourth possible implementation manner, the mapping unit is configured to map any element for the first object in the Y elements to a first bucket according to the mapping algorithm, where the first bucket refers to any bucket to which the first object can be mapped according to the mapping algorithm; and the work node further includes an update unit configured to update record information included in the first bucket, where the record information includes total traffic of all elements mapped to the first bucket and an auxiliary queue, and the auxiliary queue is used to determine an upper traffic limit, of each object mapped to the first bucket, in the first bucket.

With reference to the fourth possible implementation manner of the second aspect, in a fifth possible implementation manner, the auxiliary queue is formed by total object traffic of objects mapped to the first bucket, a first element includes a traffic value v of the first object, and the first element is an element for the first object; and the update unit is configured to, when the auxiliary queue includes total object traffic of the first object, add v to a value of the total object traffic of the first object; or, when the auxiliary queue does not include total object traffic of the first object, add the total object traffic of the first object to the auxiliary queue, and assign v to the total object traffic of the first object.

With reference to the fourth possible implementation manner of the second aspect, in a sixth possible implementation manner, the auxiliary queue is formed by total object traffic of objects mapped to the first bucket, a first element includes a traffic value v of the first object, and the first element is an element for the first object; the record information further includes a maximum allowable capacity of the auxiliary queue; and the update unit is configured to, in a case in which a value of a current capacity of the auxiliary queue is less than a value of the maximum allowable capacity, when the auxiliary queue does not include total object traffic of the first object, add the total object traffic of the first object to the auxiliary queue, and assign v to the total object traffic of the first object.

With reference to the fifth possible implementation manner of the second aspect, in a seventh possible implementation manner, the record information further includes a maximum allowable capacity of the auxiliary queue, and a value of a current capacity of the auxiliary queue is greater than or equal to a value of the maximum allowable capacity of the auxiliary queue; and the work node further includes an expanding unit configured to, when the value of the maximum allowable capacity of the auxiliary queue meets a preset expansion condition, expand storage space corresponding to the value of the maximum allowable capacity to storage space corresponding to a value of an expanded capacity, where the update unit is configured to assign the value of the expanded capacity to the maximum allowable capacity.

With reference to any one of the fourth possible implementation manner to the seventh possible implementation manner of the second aspect, in an eighth possible implementation manner, the auxiliary queue does not include total object traffic of the first object, the record information further includes a maximum allowable capacity of the auxiliary queue and an object traffic estimation error of the first bucket, a value of the maximum allowable capacity of the auxiliary queue does not meet a preset expansion condition, a first element includes a traffic value v of the first object, the first element is an element for the first object, and the object traffic estimation error of the first bucket is used to determine an upper traffic limit, of an object mapped to the first bucket, in the first bucket; and the work node further includes a first determining unit configured to determine a minimum value between v and a value of total object traffic of each object in the auxiliary queue, where the update unit is configured to subtract the minimum value from the value of the total object traffic of each object in the auxiliary queue, and add the minimum value to a value of the object traffic estimation error of the first bucket.

With reference to the eighth possible implementation manner of the second aspect, in a ninth possible implementation manner, when the auxiliary queue includes total object traffic having a value being zero, the update unit is further configured to delete the total object traffic having a value being zero; add the total object traffic of the first object to the auxiliary queue; and assign v to the total object traffic of the first object.

With reference to the eighth possible implementation manner or the ninth possible implementation manner of the second aspect, in a tenth possible implementation manner, the work node further includes a deleting unit configured to, when the auxiliary queue does not include total object traffic having a value being zero, delete the first element.

With reference to the seventh possible implementation manner or the eighth possible implementation manner of the second aspect, in an eleventh possible implementation manner, the work node further includes a second determining unit configured to determine whether a value L of the maximum allowable capacity of the auxiliary queue meets the preset expansion condition, and configured to determine a quantity k of rounds of current expansion; when $(k+1)(k+2)-1>L$, determine that the value of the maximum allowable capacity of the auxiliary queue meets the preset expansion condition; and when $(k+1)(k+2)-1 \leq L$, determine that the value of the maximum allowable capacity of the auxiliary queue does not meet the preset expansion condition, where the value of the expanded capacity is $(k+1)(k+2)-1$.

With reference to the eleventh possible implementation manner of the second aspect, in a twelfth possible implementation manner, the second determining unit is configured to determine the quantity k of rounds of current expansion according to a formula $$k = \frac{W}{T},$$

where W refers to total traffic, of all elements mapped to the first bucket, obtained after the first element is mapped to the first bucket; T refers to a dynamic expansion parameter; when the preset abnormal object type is a heavy hitter, $T=\phi$; or, when the preset abnormal object type is a heavy changer, $T=\epsilon\phi$, where $\phi$ refers to a preset total object traffic threshold of the first object, $\epsilon$ is a constant, and $0<\epsilon \leq 1$.

With reference to the eighth possible implementation manner of the second aspect, in a thirteenth possible implementation manner, the first element is an element for the first object in the Y elements, and specifically is the last element for the first object; and the second acquiring unit is configured to acquire an upper traffic limit of the first object in the first bucket, and configured to, when the total object traffic of the first object is in the auxiliary queue, use the value of the total object traffic of the first object as a lower traffic limit of the first object in the first bucket; and when the total object traffic of the first object is not in the auxiliary queue, use zero as a lower traffic limit of the first object in the first bucket; and use a sum of the lower traffic limit of the first object in the first bucket and the object traffic estimation error of the first bucket as the upper traffic limit of the first object in the first bucket.

According to a third aspect, a system for identifying an abnormal IP data stream is provided, including a data collection node and the work node provided by the second aspect, where the data collection node is configured to send Y elements.

According to the method, apparatus, and system for identifying an abnormal IP data stream provided by the embodiments of the present invention, a bucket is acquired as a target bucket, where total traffic of all elements mapped to the bucket within a current time interval is greater than or equal to a first threshold, and whether a first object is an abnormal object is further identified according to a preset abnormal object type and r acquired upper traffic limits of the object in r buckets, where the r buckets are buckets to which the first object is mapped, and the first object is any object mapped to the target bucket. In this solution, whether an object is an abnormal object is identified according to total traffic of all elements mapped to a bucket and an upper traffic limit of a single object in the mapped-to bucket, which can effectively avoid a problem in the prior art that because whether an object is an abnormal object is identified only using total traffic of all elements mapped to a bucket, some small-traffic objects are wrongly identified as heavy hitters, thereby improving identification accuracy.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by persons of ordinary skill in the art based on the embodiments of the present invention without creative efforts shall fall within the protection scope of the present invention.

It should be noted that the term "and/or" in this specification describes only an association relationship for describing associated objects and represents that three relationships may exist. For example, A and/or B may represent the following three cases: Only A exists, both A and B exist, and only B exists. The character "/" in this specification generally indicates an "or" relationship between the associated objects. The term "multiple" in this specification indicates two or more than two.

Embodiment 1

Figure 1:
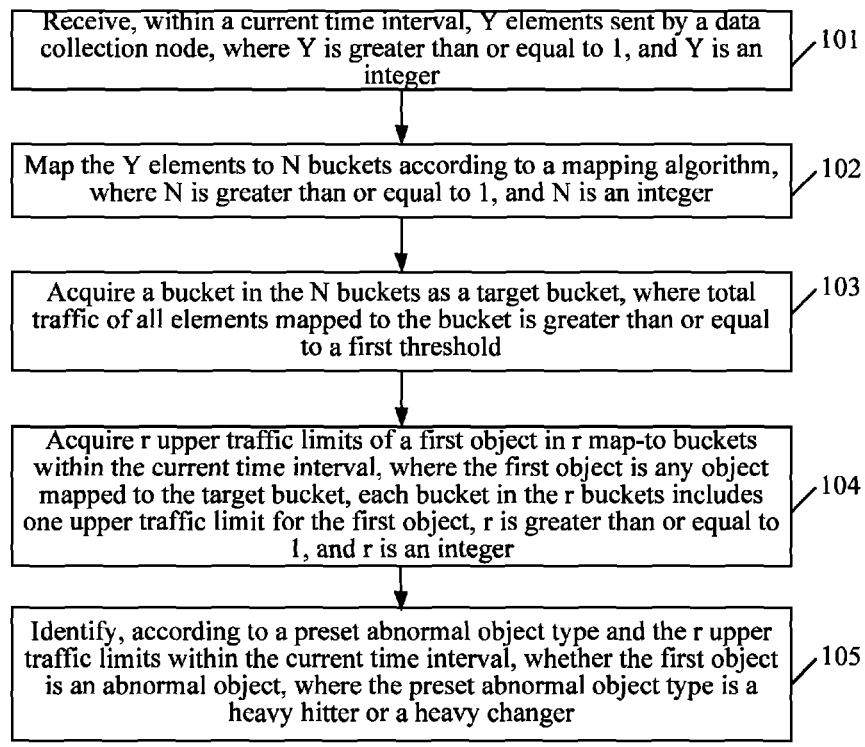
FIG. 1 is a schematic flowchart of a method for identifying an abnormal IP data stream according to an embodiment of the present invention.

FIG. 1 shows a method for identifying an abnormal IP data stream provided by this embodiment of the present invention, where the method is applied to a work node, and includes:

101: Receive, within a current time interval, Y elements sent by a data collection node, where Y is greater than or equal to 1, and Y is an integer.

Both the "work node" and the "data collection node" may be a device such as a server or a personal computer (PC). In addition, different work nodes and/or data collection nodes may also be distributed in different central processing units (CPUs) of a same device. It should be noted that, for the convenience of description, an example in which different work nodes and/or data collection nodes are distributed in different devices is used for description below.

Each server or PC may be used as the work node or the data collection node. However, in a same application scenario, a same node generally is not used as the work node and the data collection node at the same time. The "application scenario" herein may include one or more data collection nodes and one or more work nodes.

Each element is formed by an object and a value corresponding to the object, and the "element" may be represented as: element (object, value), that is, (key, value), where the "value" included in the element may be a traffic value of the element or information that can indicate a traffic value of the element. It should be noted that, unless otherwise specified, the "value" included in the element refers to the traffic value of the element below. Objects included in different elements may be the same or may be different, and values included in different elements may be the same or different, for example, element 1 (object 1, value 1), element 2 (object 1, value 2), element 3 (object 2, value 3), element 4 (object 2, value 1), and the like.

Different elements for a same object generally come from a same data collection node or several fixed data collection nodes. In an implementation, each data collection node may distribute collected different elements to one or more preset work nodes according to a particular distribution rule, and this embodiment of the present invention does not limit a specific distribution rule. The distribution rule may include work nodes in which objects are distributed are preset in the data collection node, and when the data collection node acquires an element, the data collection node sends, according to an object for the element, the element to one of preset work nodes in which the object is distributed.

This embodiment of the present invention does not limit a value of the "current time interval".

102: Map the Y elements to N buckets according to a mapping algorithm, where N is greater than or equal to 1, and N is an integer.

To clearly describe the technology provided by this embodiment of the present invention, a "data structure table" is first described. The "data structure table" is stored in a storage unit of the work node, and is formed by I rows and J columns of buckets, where I is greater than or equal to 1, J is greater than or equal to 1, and I and J are integers. Each row in the data structure table corresponds to one hash function, where the hash function is used to map an element received by the work node to a bucket in this row. The data structure table may be of a sketch data structure. The "bucket" refers to a storage unit used for storing each element in an I×J matrix. Persons skilled in the art should understand that, the "element in the matrix" and the "element" described in other parts of this specification are different concepts. In an implementation, values of I and J are related to a size of occupied space of a memory, and may be determined according to a method in the prior art.

Exemplarily, step 102 may include mapping, by the work node, the Y elements to each row separately according to a mapping algorithm corresponding to each row in the data structure table (that is, a hash function corresponding to each row in the data structure table). In an implementation, when receiving each element, the work node may map the element to each row according to the mapping algorithm corresponding to each row in the data structure table. This embodiment of the present invention does not limit a specific mapping algorithm, which may be a mapping algorithm in the prior art.

In the mapping algorithm, mapping is performed according to an object; therefore, in any row in the data structure table, different elements for a same object (that is, different elements including a same object) generally are mapped to a same bucket, and different elements for different objects generally are mapped to different buckets. It should be noted that, in an implementation, on one hand, there are a small quantity of buckets, and there are a large quantity of objects; therefore, different objects always need to be mapped to a same bucket; on the other hand, a case in which a same value is obtained after mapping is performed on different objects according to the mapping algorithm exists; therefore, in any row in the data structure table, elements for different objects may also be mapped to a same bucket.

103: Acquire a bucket in the N buckets as a target bucket, where total traffic of all elements mapped to the bucket is greater than or equal to a first threshold.

The work node may determine the first threshold according to an operation capability of the work node in an actual network environment; a stronger operation capability of the work node indicates a smaller first threshold, and a weaker operation capability of the work node indicates a larger first threshold; and the first threshold must ensure that at least one target bucket is selected from the N buckets. Specifically, when a target network environment used for implementing a function requires that a percentage of an abnormal object to total traffic does not exceed a threshold, the work node may determine the first threshold according to the threshold and the actual network environment. It should be noted that, percentages of abnormal traffic to the total traffic, which are required by different target network environments, may be the same or may be different. Optionally, a percentage of the abnormal traffic to the total traffic may be 1%. There may be one or more target buckets. For each bucket, the work node may record total traffic of all elements mapped to the bucket.

104: Acquire r upper traffic limits of a first object in r buckets within the current time interval, where the r buckets are buckets to which the first object is mapped, the first object is any object mapped to the target bucket, each bucket in the r buckets includes one upper traffic limit for the first object, r is greater than or equal to 1, and r is an integer.

The "r buckets" may be any r buckets to which the first object is mapped, and may be buckets, to which the first object is mapped, in each row in the data structure table, that is, r=I. For each bucket, the work node may record an upper traffic limit of each object mapped to the bucket.

Optionally, step 102 may include mapping any element for the first object in the Y elements to a first bucket in the N buckets according to the mapping algorithm, where the first bucket refers to any bucket to which the first object can be mapped according to the mapping algorithm. In this case, the method further includes updating record information included in the first bucket, where the record information includes total traffic of all elements mapped to the first bucket and an auxiliary queue, and the auxiliary queue is used to determine an upper traffic limit, of each object mapped to the first bucket, in the first bucket.

Exemplarily, when receiving each element in the Y elements, the work node may update the record information included in the bucket to which the element is mapped. An "object traffic value of an object" refers to total traffic of all elements for this object. The "auxiliary queue" is formed by total object traffic of some or all objects mapped to the first bucket. For a case in which the auxiliary queue is formed by total object traffic of all objects and a case in which the auxiliary queue is formed by total object traffic of some objects, and for objects of which total object traffic forms the auxiliary queue in the latter case, reference may be made to the following embodiments.

Optionally, a first element includes a traffic value v of the first object, and the first element is an element for the first object, and is any element for the first object in the Y elements; and the updating record information included in the first bucket may include, when the auxiliary queue includes total object traffic of the first object, adding v to a value of the total object traffic of the first object; or, when the auxiliary queue does not include total object traffic of the first object, adding the total object traffic of the first object to the auxiliary queue, and assigning v to the total object traffic of the first object.

It should be noted that, in this optional manner, "an upper traffic limit of the first object in a mapped-to bucket within the current time interval" is a value, acquired by the work node at an ending moment of the current time interval, of the total object traffic of the first object in record information included in the bucket.

Optionally, a size of storage space of the data structure table may be limited by setting a maximum allowable capacity of the auxiliary queue, so as to avoid a problem that an excessively large capacity of the auxiliary queue in the bucket causes excessively large storage space of the data structure table. The auxiliary queue is formed by total object traffic of objects mapped to the first bucket, a first element includes a traffic value v of the first object, and the first element is an element for the first object; the record information further includes the maximum allowable capacity of the auxiliary queue; and the updating record information included in the first bucket includes, in a case in which a value of a current capacity of the auxiliary queue is less than a value of the maximum allowable capacity, when the auxiliary queue does not include total object traffic of the first object, adding the total object traffic of the first object to the auxiliary queue, and assigning v to the total object traffic of the first object.

Optionally, in a case in which a value of a current capacity of the auxiliary queue is greater than or equal to a value of the maximum allowable capacity of the auxiliary queue, the present invention further provides an embodiment for appropriately expanding storage space occupied by the auxiliary queue (that is, storage space corresponding to the value of the maximum allowable capacity of the auxiliary queue). The record information further includes the maximum allowable capacity of the auxiliary queue, and the value of the current capacity of the auxiliary queue is greater than or equal to the value of the maximum allowable capacity of the auxiliary queue; before the adding the total object traffic of the first object to the auxiliary queue, the method may further include, when the value of the maximum allowable capacity of the auxiliary queue meets a preset expansion condition, expanding storage space corresponding to the value of the maximum allowable capacity to storage space corresponding to a value of an expanded capacity; and in this case, the updating record information included in the first bucket further includes assigning the value of the expanded capacity to the maximum allowable capacity of the auxiliary queue.

Exemplarily, this embodiment of the present invention does not limit specific content and determining manners of the "preset expansion condition" and the "value of the expanded capacity", which may be determined according to empirical values. The following provides an optional implementation manner. The method may further include determining whether a value L of the maximum allowable capacity of the auxiliary queue meets the preset expansion condition, which includes determining a quantity k of rounds of current expansion; when (k+1)(k+2)−1>L, determining that the value of the maximum allowable capacity of the auxiliary queue meets the preset expansion condition; and when (k+1)(k+2)−1≤L, determining that the value of the maximum allowable capacity of the auxiliary queue does not meet the preset expansion condition; in this case, the value of the expanded capacity is (k+1)(k+2)−1. In addition, the preset expansion condition and the value of the expanded capacity may also be determined according to other empirical values.

Exemplarily, the determining a quantity k of rounds of current expansion may include determining the quantity k of rounds of current expansion according to a formula $$k = \frac{W}{T},$$

where W refers to total traffic, of all elements mapped to the first bucket, obtained after the first element is mapped to the first bucket; T refers to a dynamic expansion parameter; when the preset abnormal object type is a heavy hitter, $T=\phi$; or, when the preset abnormal object type is a heavy changer, $T=\epsilon\phi$, where $\phi$ refers to a preset total object traffic threshold of the first object, $\epsilon$ is a constant, and $0<\epsilon\leq1$. Exemplarily, total object traffic thresholds of different objects may be the same or may be different.

In addition, optionally, the auxiliary queue does not include total object traffic of the first object, the record information further includes a maximum allowable capacity of the auxiliary queue and an object traffic estimation error of the first bucket, a value of the maximum allowable capacity of the auxiliary queue does not meet a preset expansion condition, and a first element includes a traffic value v of the first object; and before the updating record information included in the first bucket, the method may further include determining a minimum value between v and a value of total object traffic of each object in the auxiliary queue; in this case, the updating record information included in the first bucket includes subtracting the minimum value from the value of the total object traffic of each object in the auxiliary queue, and adding the minimum value to a value of the object traffic estimation error of the first bucket.

Exemplarily, for the "preset expansion condition" and the determining manner in this optional manner, reference may be made to the foregoing description. In this optional manner, when the auxiliary queue includes total object traffic having a value being zero, the updating record information included in the first bucket may further include deleting the total object traffic having a value being zero; adding the total object traffic of the first object to the auxiliary queue; and assigning v to the total object traffic of the first object. In addition, when the auxiliary queue does not include the total object traffic having a value being zero, the method may further include deleting the first element.

It should be noted that, in this optional manner, the "upper traffic limit of the first object in the mapped-to bucket within the current time interval" may be obtained using the following manner.

The first element is an element for the first object in the Y elements, and is the last element for the first object; in this case, step 104 may include acquiring an upper traffic limit of the first object in the first bucket, which includes, when the total object traffic of the first object is in the auxiliary queue, using the value of the total object traffic of the first object as a lower traffic limit of the first object in the first bucket; and when the total object traffic of the first object is not in the auxiliary queue, using zero as a lower traffic limit of the first object in the first bucket; and using a sum of the lower traffic limit of the first object in the first bucket and the object traffic estimation error of the first bucket as the upper traffic limit of the first object in the first bucket.

105: Identify, according to a preset abnormal object type and the r upper traffic limits within the current time interval, whether the first object is an abnormal object, where the preset abnormal object type is a heavy hitter or a heavy changer.

Optionally, the preset abnormal object type is a heavy hitter; in this case, step 104 may include, when r1 upper traffic limits in the r upper traffic limits within the current time interval are all greater than or equal to a second threshold, determining that the first object is a heavy hitter, where r≥r1≥1.

In addition, optionally, the preset abnormal object type is a heavy changer; in this case, the method may further include acquiring r upper traffic limits of the first object in the r buckets within a previous time interval of the current time interval, where the r buckets are buckets to which the first object is mapped; in this case, step 105 may include acquiring variations of the r upper traffic limits according to the r upper traffic limits within the current time interval and the r upper traffic limits within the previous time interval of the current time interval; and when variations of r2 upper traffic limits in the variations of the r upper traffic limits are all greater than or equal to a third threshold, determining that the first object is a heavy changer, where r≥r2≥1.

The work node may determine the second threshold according to an operation capability of the work node in an actual network environment; a stronger operation capability of the work node indicates a smaller second threshold, and a weaker operation capability of the work node indicates a larger second threshold; and the second threshold must ensure that at least one heavy hitter is selected from objects for the Y elements.

The work node may determine the third threshold according to an operation capability of the work node in an actual network environment; a stronger operation capability of the work node indicates a smaller third threshold, and a weaker operation capability of the work node indicates a larger third threshold; and the third threshold must ensure that at least one heavy changer is selected from objects for the Y elements.

In an implementation, the second threshold and the third threshold may be the same or may be different.

Optionally, elements for the first object are distributed in d work nodes including the work node, where d is greater than or equal to 2, and d is an integer, the d work nodes obtain d abnormal object sets through identification, and each work node obtains one abnormal object set through identification. In order to further improve identification accuracy, after step 104, the method may further include any one of the following three implementation manners.

Manner 1: Receive (d−1) abnormal object sets sent by the other (d−1) work nodes, and when d1 abnormal object sets in the d abnormal object sets all include the first object, determine that the first object is a target abnormal object, where d≥d1≥1.

Manner 2: Send, to a control node, an abnormal object set obtained through identification by the work node, so that when d2 abnormal object sets in the d abnormal object sets all include the first object, the control node determines that the first object is a target abnormal object, where d≥d2≥1.

Manner 3: Send, to any work node in the other (d−1) work nodes, an abnormal object set obtained through identification by the work node, so that when d3 abnormal object sets in the d abnormal object sets all include the first object, the any work node determines that the first object is a target abnormal object, where d≥d3≥1.

Exemplarily, for clear description, a concept of an "aggregation node" is introduced, where the aggregation node is configured to aggregate the abnormal object sets obtained by the work nodes, to determine a final abnormal object (that is, the target abnormal object), that is, the aggregation node is an execution body for determining the target abnormal object in the foregoing manner 1, manner 2, and manner 3, that is, the aggregation node may be any work node or may be any node (such as the "control node") independent of the work node. The work node may prestore an identifier of an aggregation node for the first object, and is configured to send the abnormal object set to the aggregation node when one time interval ends. The identifier of the aggregation node may be set in the aggregation node under an instruction of a user, or may be obtained by receiving information sent by the data collection node or any node.

It should be noted that, the "abnormal object set" refers to a set formed by abnormal objects, and for a manner of determining each abnormal object in the abnormal object set by each work node, reference may be made to the manner of determining the abnormal object in step 101 to step 103.

According to the method for identifying an abnormal IP data stream provided by this embodiment of the present invention, a work node acquires a bucket as a target bucket, where total traffic of all elements mapped to the bucket within a current time interval is greater than or equal to a first threshold, and further identifies, according to a preset abnormal object type and r acquired upper traffic limits of a first object in r buckets, whether the object is an abnormal object, where the r buckets are buckets to which the first object is mapped, and the first object is any object mapped to the target bucket. In this solution, whether an object is an abnormal object is identified according to total traffic of all elements mapped to a bucket and an upper traffic limit of a single object in the mapped-to bucket, which can effectively avoid a problem in the prior art that because whether an object is an abnormal object is identified only using total traffic of all elements mapped to a bucket, some small-traffic objects are wrongly identified as heavy hitters, thereby improving identification accuracy.

The following exemplarily describes, using specific embodiments, the method for identifying an abnormal IP data stream described above.

It should be noted that, in the following two embodiments, record information included in any bucket in the data structure table includes total traffic of all elements mapped to the bucket, an auxiliary queue, a maximum allowable capacity of the auxiliary queue, and an object traffic estimation error of the bucket. At a start moment of the current time interval, a value of the total traffic of all the elements mapped to the bucket is zero, a value of the object traffic estimation error of the bucket is zero, a value L of the maximum allowable capacity is a preset threshold, and the auxiliary queue includes object traffic values of L empty objects. In addition, the control node and the work node are different nodes. The following two embodiments both include the following parts: an element distribution and mapping process, a record information updating process, an identification process of a work node, and an identification process of a control node.

First Embodiment

This embodiment is used to determine a target heavy hitter, that is, a preset abnormal object type is a heavy hitter. This embodiment includes:

(1) Element Distribution and Mapping Process:

A data collection node acquires Y elements in total within a current time interval. The following describes the element distribution and mapping process using an element $(x, v_x)$ as an example, where x represents an object x, and $v_x$ represents a traffic value of the object x.

Figure 2:
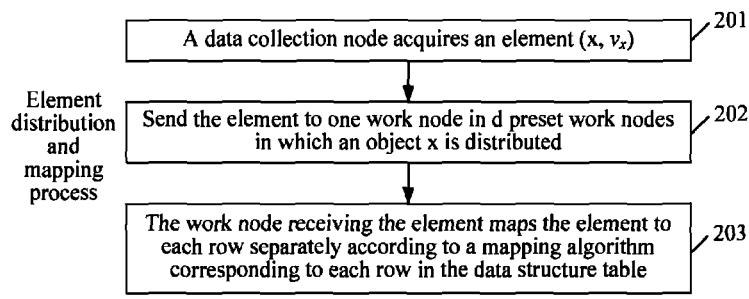
FIG. 2 is a schematic flowchart of an element distribution and mapping process according to an embodiment of the present invention.

As shown in FIG. 2, the element distribution and mapping process includes:

201: A data collection node acquires the element $(x, v_x)$.

202: Send the element to one work node in d preset work nodes in which the object x is distributed, where d is greater than or equal to 1.

Exemplarily, the data collection node may prestore a work node in which each object is distributed, where quantities of work nodes in which different objects are distributed may be the same or different, and the work nodes in which different objects are distributed may be completely or partially the same or may be different. When the data collection node acquires an element, the data collection node determines, according to an object of the element, d work nodes in which the object is distributed, so as to send the element to one work node in the d work nodes.

It should be noted that, the data collection node may determine, according to an attribute feature of an object, a work node in which the object is distributed, where the attribute feature of the object may include a quintuple of the object. Operation is performed on quintuple information of each object according to a hash function, so as to determine a work node in which each object is distributed. The hash function has the property of randomness; therefore, evenness of the distribution can be ensured, thereby ensuring a load balance of a system.

203: The work node receiving the element maps the element to each row according to a mapping algorithm corresponding to each row in a data structure table, where the element is mapped to I buckets, I is a quantity of rows in the data structure table, I is greater than or equal to 1, and I is an integer.

Exemplarily, for each row in the data structure table, the work node receiving the element maps the element to one bucket in a row according to a mapping algorithm corresponding to the row.

(2) Record Information Updating Process:

The work node receiving the element $(x, v_x)$ executes the record information updating process for each bucket in the I buckets, where the record information updating process for each bucket in the I buckets may be executed sequentially, or may be executed simultaneously. The following describes the record information updating process using the $i^{th}$ bucket as an example, where $1 \leq i \leq I$, and i is an integer.

Figure 3:
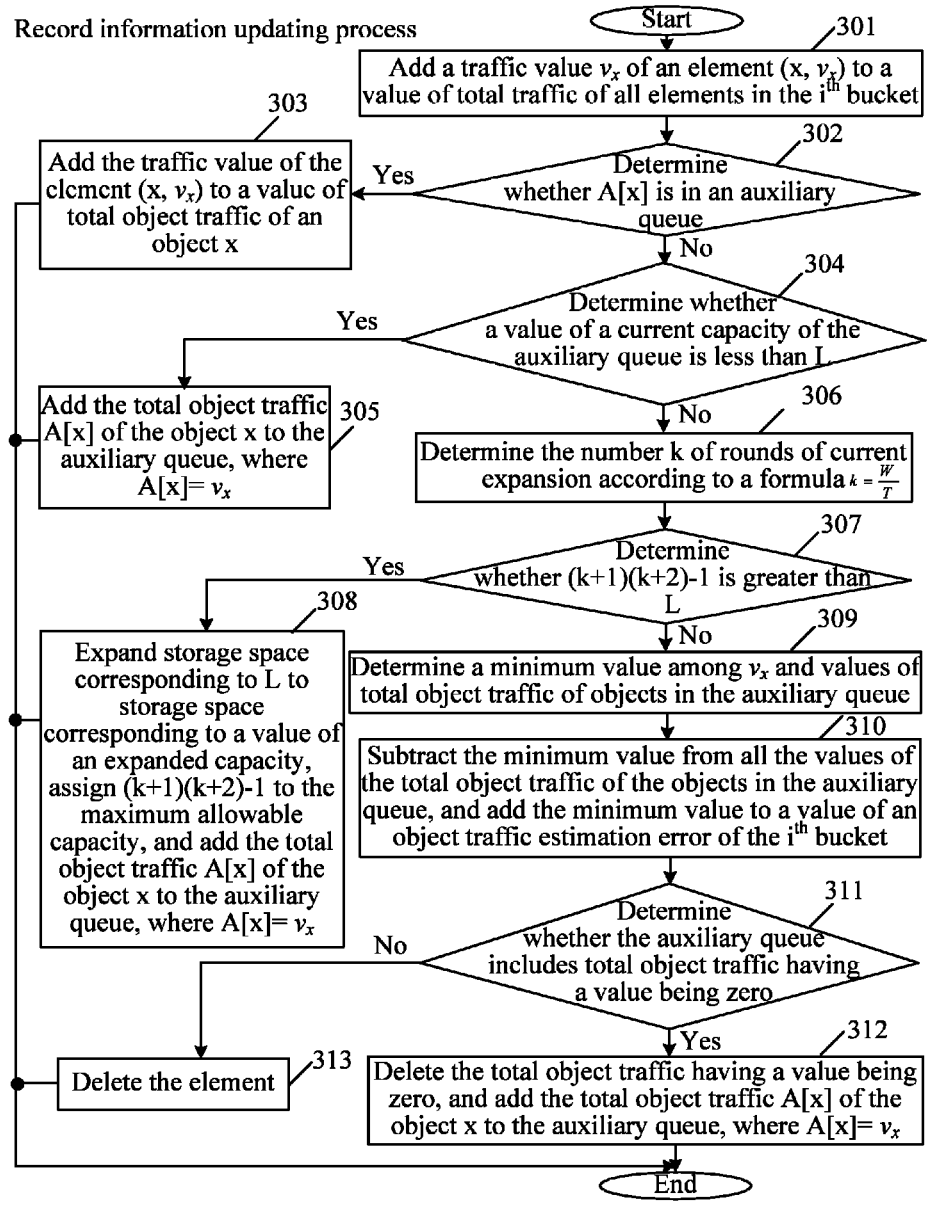
FIG. 3 is a schematic flowchart of a record information updating process according to an embodiment of the present invention.

As shown in FIG. 3, the updating process includes:

301: Add the traffic value $v_x$ of the element (x, $v_x$) to a value of total traffic of all elements in the $i^{th}$ bucket.

Exemplarily, step 301 may be described as updating the total traffic of all the elements mapped to the $i^{th}$ bucket.

302: Determine whether total object traffic A[x] of the object x is in an auxiliary queue.

If the total object traffic A[x] of the object x is in the auxiliary queue, it indicates that the work node has not received an element for the object x or has deleted all received elements for the object x within a current time interval, and step 303 is performed; and if the total object traffic A[x] of the object x is not in the auxiliary queue, it indicates that the work node has received the element for the object x within the current time interval and does not delete the received elements for the object x or does not completely delete the received elements for the object x, and step 304 is performed.

303: Add the traffic value $v_x$ of the element (x, $v_x$) to a value of the total object traffic of the object x.

Exemplarily, step 303 may be described as updating the total object traffic of the object x.

After step 303 is performed, the record information updating process for the element (x, $v_x$) ends. In this case, the record information updating process includes updating the total traffic of all the elements in the $i^{th}$ bucket.

304: Determine whether a value of a current capacity of the auxiliary queue is less than L.

If the value of the current capacity of the auxiliary queue is less than L, it indicates that the current capacity of the auxiliary queue does not reach a maximum allowable capacity, that is, total object traffic for an object may also be added to the auxiliary queue, and step 305 is performed; and if the value of the current capacity of the auxiliary queue is not less than L, it indicates that the current capacity of the auxiliary queue has reached the maximum allowable capacity, and step 306 is performed.

Exemplarily, the current capacity of the auxiliary queue refers to a quantity of total object traffic of non-empty objects included in the auxiliary queue. L refers to a quantity of all total object traffic allowed to be included in the auxiliary queue, and includes a quantity of total object traffic of non-empty objects and/or a quantity of total object traffic of empty objects.

305: Add the total object traffic A[x] of the object x to the auxiliary queue, where A[x]=$v_x$.

Exemplarily, the "adding the total object traffic A[x] of the object x to the auxiliary queue" may be implemented as updating total object traffic of one empty object in the auxiliary queue with the total object traffic A[x] of the object x. "A[x]=$v_x$" may be described as assigning $v_x$ to A[x], that is, using $v_x$ as an initial value of A[x].

After step 305 is performed, the record information updating process for the element (x, $v_x$) ends. In this case, the record information updating process includes updating the total traffic of all the elements in the $i^{th}$ bucket and the auxiliary queue.

306: Determine a quantity k of rounds of current expansion according to a formula $$k = \frac{W}{T},$$

where W refers to the value of the total traffic of all the elements mapped to the $i^{th}$ bucket within the current time interval; T refers to a dynamic expansion parameter; T=$\phi$, where $\phi$ refers to a preset total object traffic threshold of the object x.

Exemplarily, the total object traffic threshold of the object x may be preset in the following manners. Manner 1: the total object traffic threshold is determined according to an expected quantity of heavy hitters, for example, the expected quantity of heavy hitters is 100, and it is known that the maximum traffic of a network within a particular period of time is S (bandwidth×time), so that the total object traffic threshold of the object x may be S÷100; and manner 2: total traffic S' within each time interval is estimated using a self-adaptive algorithm (such as an exponentially weighted moving average (EWMA)), and the total object traffic threshold of the object x is set to S'/100.

307: Determine whether (k+1)(k+2)−1 is greater than L.

If (k+1)(k+2)−1 is greater than L, it indicates that k and L satisfy a preset expansion condition, and step 308 is performed; and if (k+1)(k+2)−1 is not greater than L, it indicates that k and L do not meet the preset expansion condition, and step 309 is performed.

308: Expand storage space corresponding to L to storage space corresponding to a value of an expanded capacity, assign (k+1)(k+2)−1 to the maximum allowable capacity, and add the total object traffic A[x] of the object x to the auxiliary queue, where A[x]=$v_x$.

Exemplarily, the "expanding storage space corresponding to L to storage space corresponding to a value of an expanded capacity" may be implemented as adding total object traffic of (k+1)(k+2)−1 empty objects to the auxiliary queue. The "assigning (k+1)(k+2)−1 to the maximum allowable capacity" may be described as updating the maximum allowable capacity.

After step 308 is performed, the record information updating process for the element (x, $v_x$) ends. In this case, the record information updating process includes updating the total traffic of all the elements in the $i^{th}$ bucket, the auxiliary queue, and the maximum allowable capacity of the auxiliary queue.

309: Determine a minimum value between $v_x$ and a value of total object traffic of each object in the auxiliary queue.

310: Subtract the minimum value from the value of the total object traffic of each object in the auxiliary queue, and add the minimum value to a value of an object traffic estimation error of the $i^{th}$ bucket.

Exemplarily, the "adding the minimum value to a value of an object traffic estimation error of the $i^{th}$ bucket" may be described as updating the object traffic estimation error of the $i^{th}$ bucket. It should be noted that, when no element is mapped to the $i^{th}$ bucket, the value of the object traffic estimation error of the $i^{th}$ bucket is 0.

311: Determine whether the auxiliary queue includes total object traffic having a value being zero.

If the auxiliary queue includes the total object traffic having a value being zero, it indicates that the "minimum value" in step 310 is values of one or more pieces of total object traffic in the auxiliary queue, and further, the total object traffic having a value being zero does not need to be recorded in the auxiliary queue at a current moment, the total object traffic of the object x needs to be recorded, and step 312 is performed; and if the auxiliary queue does not include the total object traffic having a value being zero, it indicates that the "minimum value" in step 310 is $v_x$, and further, the total object traffic of the object x does not need to be recorded at the current moment, and step 313 is performed.

312: Delete the total object traffic having a value being zero, and add the total object traffic A[x] of the object x to the auxiliary queue, where $A[x]=v_x$.

Exemplarily, the "deleting the total object traffic having a value being zero" may be implemented as setting the total object traffic having a value being zero as total object traffic of an empty object.

After step 312 is performed, the record information updating process for the element (x, $v_x$) ends. In this case, the record information updating process includes updating the total traffic of all the elements in the $i^{th}$ bucket, the auxiliary queue, the maximum allowable capacity of the auxiliary queue, and the object traffic estimation error of the $i^{th}$ bucket.

313: Delete the element.

After step 313 is performed, the record information updating process for the element (x, $v_x$) ends. In this case, the auxiliary queue still does not include A[x]. In this case, the record information updating process includes updating the total traffic of all the elements in the $i^{th}$ bucket, the auxiliary queue, the maximum allowable capacity of the auxiliary queue, and the object traffic estimation error of the $i^{th}$ bucket.

(3) Identification Process of a Work Node:

At an ending moment of the current time interval, each work node receiving an element within the current time interval executes the identification process. At this time, record information in each bucket in a data structure table of each work node includes updated total traffic of an element mapped to this bucket, an updated auxiliary queue, a maximum allowable capacity of the updated auxiliary queue, and an updated object traffic estimation error of this bucket.

Figure 4:
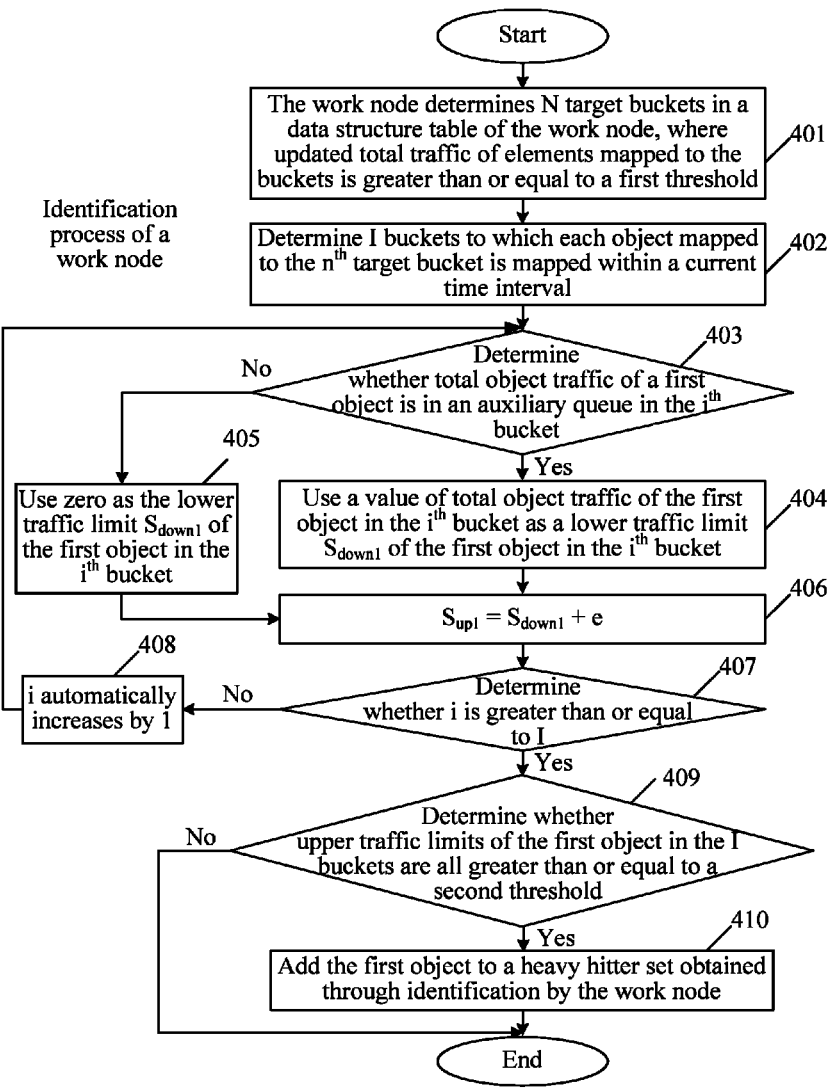
FIG. 4 is a schematic flowchart of a process of identifying abnormal traffic by a work node according to an embodiment of the present invention.

As shown in FIG. 4, the identification process of the work node includes:

401: The work node determines a bucket in a data structure table of the work node as a target bucket, where updated total traffic of elements mapped to the bucket is greater than or equal to a first threshold, where a quantity of target buckets is N, N is greater than or equal to 1, and N is an integer.

It should be noted that, in an implementation, for one work node, a quantity of received elements within the current time interval is always much greater than a quantity of buckets in a data structure table; therefore, the work node can determine the target bucket by sequentially detecting total traffic of elements mapped to each bucket, and does not need to determine the target bucket according to the object for the element.

402: Determine I buckets to which each object mapped to the $n^{th}$ target bucket is mapped within the current time interval, where $1 \leq n \leq N$, and n is an integer.

It should be noted that step 402 is performed for each target bucket in the N target buckets.

Exemplarily, it is assumed that the data structure table includes 3×4 buckets, that is, has 3 rows and 4 columns, that is, 12 buckets in total, a position of the $n^{th}$ target bucket is the first row and the second column in the data structure table, that is, the $n^{th}$ target bucket may be represented as a bucket 12. Objects mapped to the bucket 12 include an object x1, an object x2, an object x3, and an object x4, and the buckets to which the four objects are mapped may be shown in Table 1.

TABLE 1

| Object | Buckets to which the object is mapped |
| --- | --- |
| x1 | Bucket 12, bucket 23, and bucket 33 |
| x2 | Bucket 12, bucket 21, and bucket 31 |
| x3 | Bucket 12, bucket 24, and bucket 34 |
| x4 | Bucket 12, bucket 24, and bucket 31 |

The following describes the identification process of the work node by using a first object mapped to the $n^{th}$ bucket as an example, and the process includes step 403 to step 410.

403: Determine whether total object traffic of the first object is in an auxiliary queue in the $i^{th}$ bucket, where $1 \leq i \leq I$, and i is an integer.

If the total object traffic of the first object is in the auxiliary queue in the $i^{th}$ bucket, it indicates that when executing the record information updating process, the work node deletes all elements for the first object, and step 404 is performed; and if the total object traffic of the first object is not in the auxiliary queue in the $i^{th}$ bucket, it indicates that when executing the record information updating process, the work node does not delete the elements for the first object or deletes some elements for the first object, and step 405 is performed.

It should be noted that step 403 to step 410 are performed for each object in the $n^{th}$ bucket.

404: Use a value of total object traffic of the first object in the $i^{th}$ bucket as a lower traffic limit $S_{down1}$ of the first object in the $i^{th}$ bucket.

After step 404 is performed, step 406 is performed.

405: Use zero as the lower traffic limit $S_{down1}$ of the first object in the $i^{th}$ bucket.

406: $S_{up1}=S_{down1}+e$, where $S_{up1}$ refers to an upper traffic limit of the first object in the $i^{th}$ bucket within the current time interval, and e refers to the value of the object traffic estimation error of the $i^{th}$ bucket.

407: Determine whether i is greater than or equal to I.

If i is not greater than or equal to I, step 408 is performed; and if i is greater than or equal to I, step 409 is performed.

408: i automatically increases by 1.

After step 408 is performed, step 403 is performed.

409: Determine whether upper traffic limits of the first object in the I buckets are all greater than or equal to a second threshold.

If the upper traffic limits of the first object in the I buckets are all greater than or equal to the second threshold, it indicates that the first object is a heavy hitter, and step 410 is performed; and if the upper traffic limits of the first object in the I buckets are not greater than or equal to the second threshold, it indicates that the first object is not a heavy hitter, and the process ends.

410: Add the first object to a heavy hitter set obtained through identification by the work node.

After step 410 is performed, the identification process of the work node for the first object ends.

Figure 5:
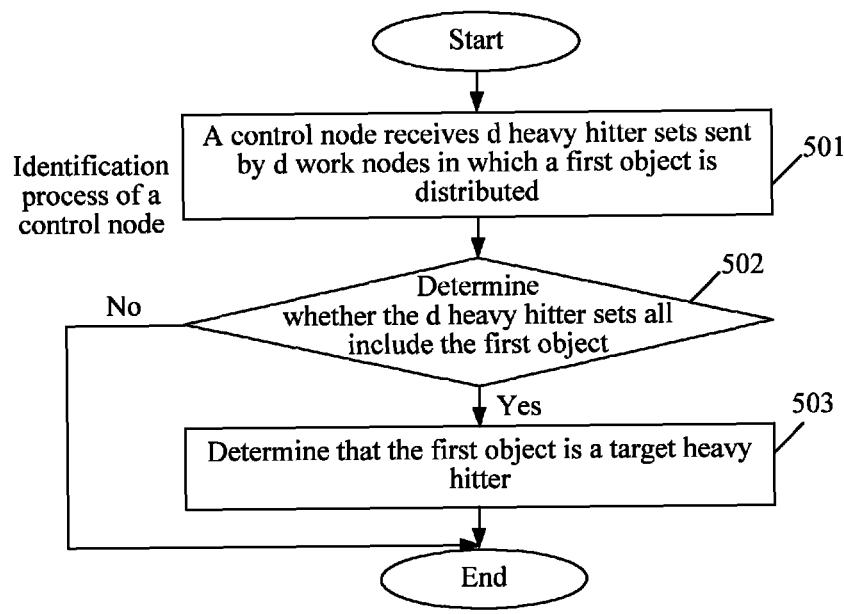
FIG. 5 is a schematic flowchart of a process of identifying abnormal traffic by a control node according to an embodiment of the present invention.

(4) Identification Process of a Control Node:

As shown in FIG. 5, the identification process of the control node includes:

501: The control node receives d heavy hitter sets sent by d work nodes in which the first object is distributed.

502: Determine whether the d heavy hitter sets all include the first object.

If the d heavy hitter sets all include the first object, step 503 is performed; and if not all the d heavy hitter sets include the first object, the identification process of the control node for the first object ends.

503: Determine that the first object is a target heavy hitter.

After step 503 is performed, the identification process of the control node for the first object ends.

According to the method for identifying an abnormal IP data stream provided by the embodiment of the present invention, a work node acquires a bucket as a target bucket, where total traffic of all elements mapped to the bucket within a current time interval is greater than or equal to a first threshold, and further identifies, according to r acquired upper traffic limits of a first object in r buckets, whether the object is a heavy hitter, where the r buckets are buckets to which the first object is mapped, and finally a control node aggregates a heavy hitter identified by each work node, so as to determine a target heavy hitter. In this solution, whether an object is an abnormal object is identified according to total traffic of all elements mapped to a bucket and an upper traffic limit of a single object in the mapped-to bucket, which can effectively avoid a problem in the prior art that because whether an object is an abnormal object is identified only using total traffic of all elements mapped to a bucket, some small-traffic objects are wrongly identified as heavy hitters, thereby improving identification accuracy.

Second Embodiment

This embodiment is used to determine a target heavy changer, that is, a preset abnormal object type is a heavy changer. This embodiment includes:

(1) Element Distribution and Mapping Process:

This process is the same as the "element distribution process" in the first embodiment.

(2) Record Information Updating Process:

A difference between this process and the "record information updating process" in the first embodiment lies in that, in this embodiment, the dynamic expansion parameter T in the foregoing step 308 satisfies $T=\epsilon\phi$, where $\epsilon$ is a constant, and $0<\epsilon\le1$. Other steps are the same as those in the "record information updating process" in the first embodiment.

Figure 6:
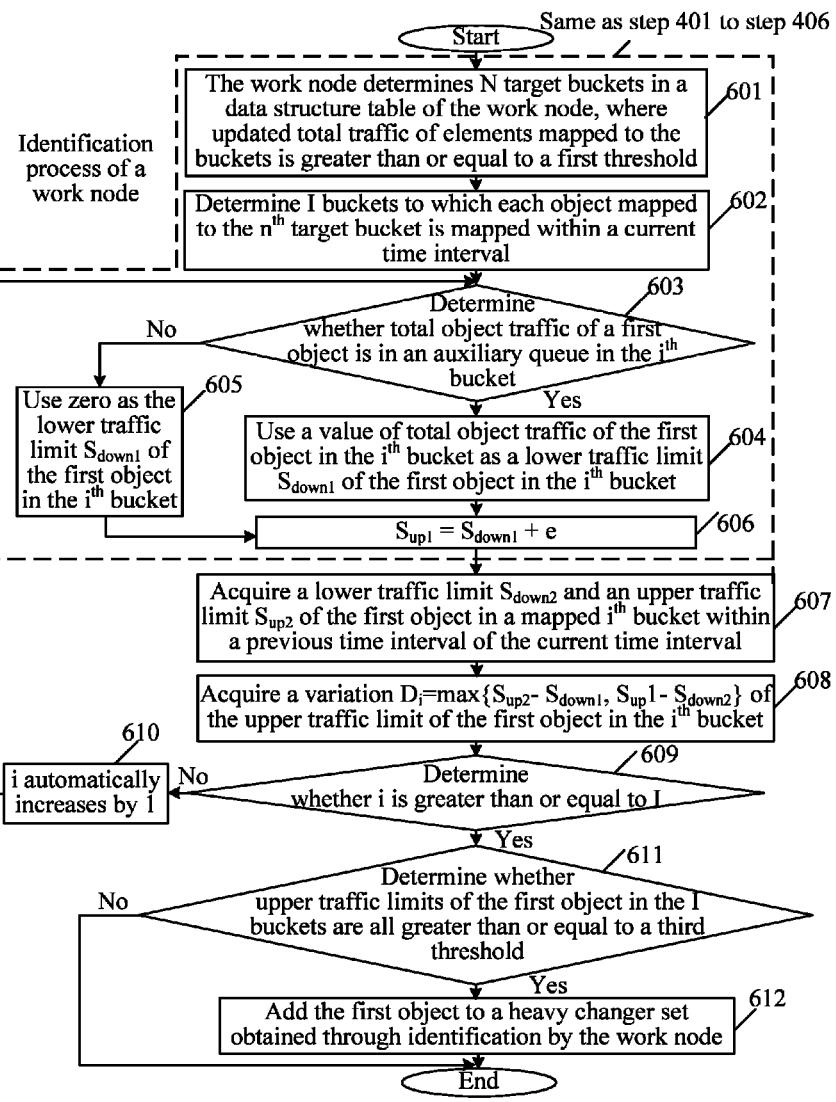
FIG. 6 is a schematic flowchart of another process of identifying abnormal traffic by a work node according to an embodiment of the present invention.

(3) Identification Process of a Work Node:

As shown in FIG. 6, the identification process of the work node includes:

601 to 606 are the same as the foregoing step 401 to step 406.

607: Acquire a lower traffic limit $S_{down2}$ and an upper traffic limit $S_{up2}$ of the first object in the mapped $i^{th}$ bucket within a previous time interval of the current time interval.

Exemplarily, for an implementation method of obtaining $S_{down2}$ and $S_{up2}$ by the work node, reference may be made to the foregoing method of obtaining $S_{down1}$ and $S_{up1}$.

608: Acquire a variation $D_i=\max\{S_{up2}-S_{down1}, S_{up1}-S_{down2}\}$ of the upper traffic limit of the first object in the $i^{th}$ bucket.

609: Determine whether i is greater than or equal to I.

If i is not greater than or equal to I, step 610 is performed; and if i is greater than or equal to I, step 611 is performed.

610: i automatically increases by 1.

After step 610 is performed, step 603 is performed.

611: Determine whether variations of the upper traffic limits of the first object in the I buckets are all greater than or equal to a third threshold. The variations of the upper traffic limits of the first object in the I buckets include: $D_1$, $D_2, \ldots, D_i, \ldots$, and $D_I$.

If the variations of the upper traffic limits of the first object in the I buckets are all greater than or equal to a third threshold, it indicates that the first object is a heavy changer, and step 612 is performed; and if not all the variations of the upper traffic limits of the first object in the I buckets are greater than or equal to a third threshold, it indicates that the first object is not a heavy changer, and the process ends.

612: Add the first object to a heavy changer set obtained through identification by the work node.

After step 612 is performed, the identification process of the work node for the first object ends.

(4) Identification Process of a Control Node:

A difference between this process and the "identification process of a control node" in the first embodiment lies in that the foregoing "heavy hitter set" is the "heavy changer set" in this embodiment, and the foregoing "target heavy hitter" is the "target heavy changer" in this embodiment.

As can be known, the method for identifying a heavy changer provided by this embodiment can be implemented by making a simple change based on the method for identifying a heavy hitter provided by the first embodiment, that is, an idea of the method for identifying an abnormal IP data stream provided by this embodiment of the present invention not only can be applied to a scenario of identifying a heavy hitter, but also can be applied to a scenario of identifying a heavy changer, thereby solving a problem in an existing technical solution that because no time interval reservation bit is reserved, the method for identifying a heavy hitter cannot be applied to identification on a heavy changer.

Embodiment 2

Figure 7:
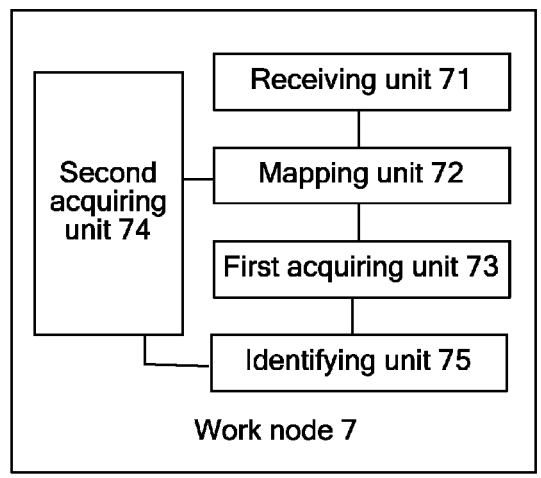
FIG. 7 is a schematic structural diagram of a work node according to an embodiment of the present invention.

FIG. 7 shows a work node 7 provided by this embodiment of the present invention, where the work node 7 is configured to execute the method for identifying an abnormal IP data stream shown in FIG. 1, and includes a receiving unit 71 configured to receive, within a current time interval, Y elements sent by a data collection node, where Y is greater than or equal to 1, and Y is an integer; a mapping unit 72 configured to map the Y elements to N buckets according to a mapping algorithm, where N is greater than or equal to 1, and N is an integer; a first acquiring unit 73 configured to acquire a bucket in the N buckets as a target bucket, where total traffic of all elements mapped to the bucket is greater than or equal to a first threshold; a second acquiring unit 74 configured to acquire r upper traffic limits of a first object in r buckets within the current time interval, where the r buckets are buckets to which the first object is mapped, the first object is any object mapped to the target bucket, each bucket in the r buckets includes one upper traffic limit for the first object, r is greater than or equal to 1, and r is an integer; and an identifying unit 75 configured to identify, according to a preset abnormal object type and the r upper traffic limits within the current time interval, whether the first object is an abnormal object, where the preset abnormal object type is a heavy hitter or a heavy changer.

Optionally, the preset abnormal object type is a heavy hitter; and the identifying unit 75 is configured to, when r1 upper traffic limits in the r upper traffic limits within the current time interval are all greater than or equal to a second threshold, determine that the first object is a heavy hitter, where $r \ge r1 \ge 1$.

Figure 8:
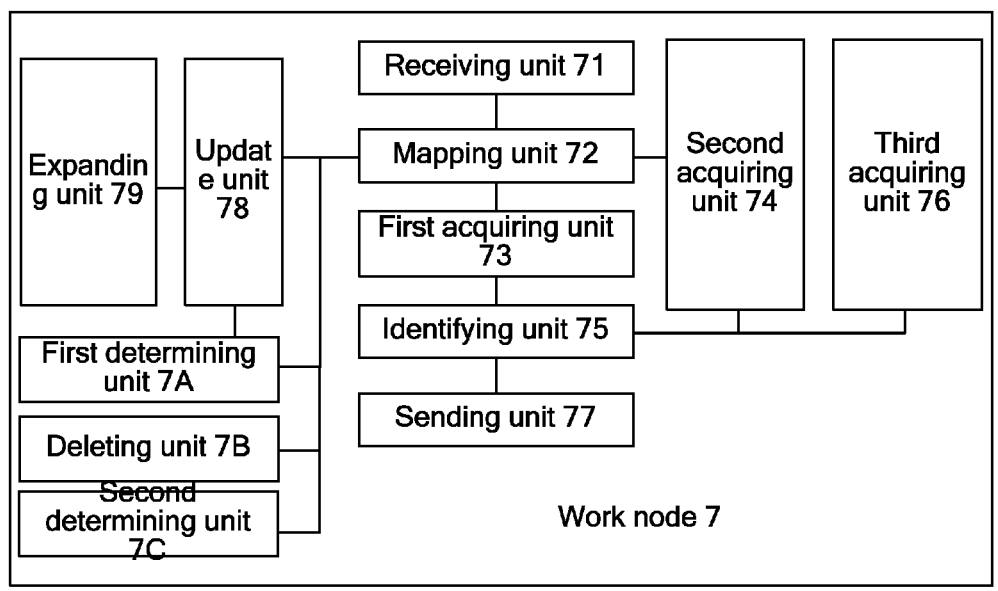
FIG. 8 is a schematic structural diagram of another work node according to an embodiment of the present invention.

Optionally, the preset abnormal object type is a heavy changer, and as shown in FIG. 8, the work node 7 further includes a third acquiring unit 76 configured to acquire r upper traffic limits of the first object in the r buckets within a previous time interval of the current time interval, where the r buckets are buckets to which the first object is mapped; where the identifying unit 75 is configured to acquire variations of the r upper traffic limits according to the r upper traffic limits within the current time interval and the r upper traffic limits within the previous time interval; and when variations of r2 upper traffic limits in the variations of the r upper traffic limits are all greater than or equal to a third threshold, determine that the first object is a heavy changer, where r≥r2≥1.

Optionally, elements for the first object are distributed in d work nodes including the work node 7, where d is greater than or equal to 2, and d is an integer, the d work nodes obtain d abnormal object sets through identification, and each work node obtains one abnormal object set through identification; and the receiving unit 71 is further configured to receive (d−1) abnormal object sets sent by the other (d−1) work nodes, and when d1 abnormal object sets in the d abnormal object sets all include the first object, determine that the first object is a target abnormal object, where d≥d1≥1; or, as shown in FIG. 8, the work node 7 further includes a sending unit 77 configured to send, to a control node, an abnormal object set obtained through identification by the work node, so that when d2 abnormal object sets in the d abnormal object sets all include the first object, the control node determines that the first object is a target abnormal object, where d≥d2≥1.

Optionally, the mapping unit 72 is configured to map any element for the first object in the Y elements to a first bucket according to the mapping algorithm, where the first bucket refers to any bucket to which the first object can be mapped according to the mapping algorithm; and as shown in FIG. 8, the work node 7 further includes an update unit 78 configured to update record information included in the first bucket, where the record information includes total traffic of all elements mapped to the first bucket and an auxiliary queue, and the auxiliary queue is used to determine an upper traffic limit, of each object mapped to the first bucket, in the first bucket.

Optionally, the auxiliary queue is formed by total object traffic of objects mapped to the first bucket, a first element includes a traffic value v of the first object, and the first element is an element for the first object; and the update unit 78 is configured to, when the auxiliary queue includes total object traffic of the first object, add v to a value of the total object traffic of the first object; or, when the auxiliary queue does not include total object traffic of the first object, add the total object traffic of the first object to the auxiliary queue, and assign v to the total object traffic of the first object.

Optionally, the auxiliary queue is formed by total object traffic of objects mapped to the first bucket, a first element includes a traffic value v of the first object, and the first element is an element for the first object; the record information further includes a maximum allowable capacity of the auxiliary queue; and the update unit 78 is configured to, in a case in which a value of a current capacity of the auxiliary queue is less than a value of the maximum allowable capacity, when the auxiliary queue does not include total object traffic of the first object, add the total object traffic of the first object to the auxiliary queue, and assign v to the total object traffic of the first object.

Optionally, the record information further includes a maximum allowable capacity of the auxiliary queue, and a value of a current capacity of the auxiliary queue is greater than or equal to a value of the maximum allowable capacity of the auxiliary queue; and as shown in FIG. 8, the work node 7 further includes an expanding unit 79 configured to, when the value of the maximum allowable capacity of the auxiliary queue meets a preset expansion condition, expand storage space corresponding to the value of the maximum allowable capacity to storage space corresponding to a value of an expanded capacity, where the update unit 78 is configured to assign the value of the expanded capacity to the maximum allowable capacity.

Optionally, the auxiliary queue does not include total object traffic of the first object, the record information further includes a maximum allowable capacity of the auxiliary queue and an object traffic estimation error of the first bucket, a value of the maximum allowable capacity of the auxiliary queue does not meet a preset expansion condition, a first element includes a traffic value v of the first object, the first element is an element for the first object, and the object traffic estimation error of the first bucket is used to determine an upper traffic limit, of an object mapped to the first bucket, in the first bucket; and as shown in FIG. 8, the work node 7 further includes a first determining unit 7A configured to determine a minimum value between v and a value of total object traffic of each object in the auxiliary queue, where the update unit 78 is configured to subtract the minimum value from the value of the total object traffic of each object in the auxiliary queue, and add the minimum value to a value of the object traffic estimation error of the first bucket.

Optionally, when the auxiliary queue includes total object traffic having a value being zero, the update unit 78 is further configured to delete the total object traffic having a value being zero; add the total object traffic of the first object to the auxiliary queue; and assign v to the total object traffic of the first object.

Optionally, as shown in FIG. 8, the work node 7 further includes a deleting unit 7B configured to, when the auxiliary queue does not include total object traffic having a value being zero, delete the first element.

Optionally, as shown in FIG. 8, the work node 7 further includes a second determining unit 7C configured to determine whether a value L of the maximum allowable capacity of the auxiliary queue meets the preset expansion condition, and configured to determine a quantity k of rounds of current expansion; when (k+1)(k+2)−1>L, determine that the value of the maximum allowable capacity of the auxiliary queue meets the preset expansion condition; and when (k+1)(k+2)−1<L, determine that the value of the maximum allowable capacity of the auxiliary queue does not meet the preset expansion condition, where the value of the expanded capacity is (k+1)(k+2)−1.

Optionally, the second determining unit 7C is configured to determine the quantity k of rounds of current expansion according to a formula $$k = \frac{W}{T},$$

where W refers to total traffic, of all elements mapped to the first bucket, obtained after the first element is mapped to the first bucket; T refers to a dynamic expansion parameter; when the preset abnormal object type is a heavy hitter, T=ϕ; or, when the preset abnormal object type is a heavy changer, T=ϵϕ, where ϕ refers to a preset total object traffic threshold of the first object, ϵ is a constant, and 0<ϵ≤1.

Optionally, the first element is an element for the first object in the Y elements, and specifically is the last element for the first object; and the second acquiring unit 7C is configured to acquire an upper traffic limit of the first object in the first bucket, and configured to, when the total object traffic of the first object is in the auxiliary queue, use the value of the total object traffic of the first object as a lower traffic limit of the first object in the first bucket; and when the total object traffic of the first object is not in the auxiliary queue, use zero as a lower traffic limit of the first object in the first bucket; and use a sum of the lower traffic limit of the first object in the first bucket and the object traffic estimation error of the first bucket as the upper traffic limit of the first object in the first bucket.

Exemplarily, the work node 7 may be a device such as a server or a PC.

The work node provided by this embodiment of the present invention acquires a bucket as a target bucket, where total traffic of all elements mapped to the bucket within a current time interval is greater than or equal to a first threshold, and further identifies, according to a preset abnormal object type and r acquired upper traffic limits of a first object in r buckets, whether the object is an abnormal object, where the r buckets are buckets to which the first object is mapped, and the first object is any object mapped to the target bucket. In this solution, whether an object is an abnormal object is identified according to total traffic of all elements mapped to a bucket and an upper traffic limit of a single object in the mapped-to bucket, which can effectively avoid a problem in the prior art that because whether an object is an abnormal object is identified only using total traffic of all elements mapped to a bucket, some small-traffic objects are wrongly identified as heavy hitters, thereby improving identification accuracy.

Embodiment 3

For hardware implementation, the sending unit in FIG. 8 may be a transmitter, the receiving unit may be a receiver, and the transmitter and the receiver may be integrated into a transceiver. Other units except the storage unit may be embedded into or independent of a processor of the work node in the form of hardware, and may also be stored in a memory of the work node in the form of software, so that the processor invokes and executes an operation corresponding to each module, where the processor may be a CPU, a microprocessor, a single chip, and the like.

Figure 9:
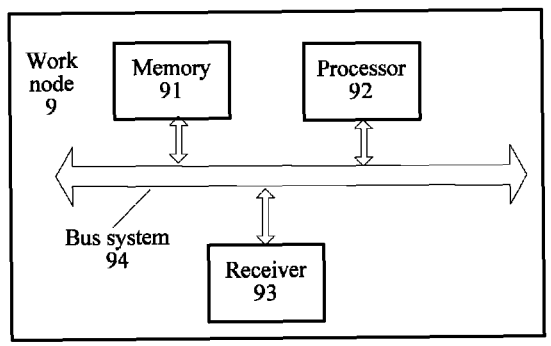
FIG. 9 is a schematic structural diagram of another work node according to an embodiment of the present invention.

FIG. 9 shows a work node 9 provided by this embodiment of the present invention, where the work node 9 is configured to execute the method for identifying an abnormal IP data stream shown in FIG. 1, and includes a memory 91, a processor 92, a receiver 93, and a bus system 94.

The memory 91, the processor 92, and the receiver 93 are coupled together by the bus system 94, and in addition to a data bus, the bus system 94 may also include a power bus, a control bus, a state signal bus, and the like. However, for clear description, various buses are marked as the bus system 94 in the figure.

The memory 91 is configured to store a set of code, where the code is used for controlling the processor 92 and the receiver 93 to execute corresponding actions, and the receiver 93 is configured to receive, within a current time interval, Y elements sent by a data collection node, where Y is greater than or equal to 1, and Y is an integer; and the processor 92 is configured to execute the following actions: mapping the Y elements to N buckets according to a mapping algorithm, where N is greater than or equal to 1, and N is an integer; acquiring a bucket in the N buckets as a target bucket, where total traffic of all elements mapped to the bucket is greater than or equal to a first threshold; acquiring r upper traffic limits of a first object in r buckets within the current time interval, where the r buckets are buckets to which the first object is mapped, the first object is any object mapped to the target bucket, each bucket in the r buckets includes one upper traffic limit for the first object, r is greater than or equal to 1, and r is an integer; and identifying, according to a preset abnormal object type and the r upper traffic limits within the current time interval, whether the first object is an abnormal object, where the preset abnormal object type is a heavy hitter or a heavy changer.

Optionally, the preset abnormal object type is a heavy hitter; and the processor 92 is configured to, when r1 upper traffic limits in the r upper traffic limits within the current time interval are all greater than or equal to a second threshold, determine that the first object is a heavy hitter, where r≥r1≥1.

Optionally, the preset abnormal object type is a heavy changer, and the processor 92 is further configured to acquire r upper traffic limits of the first object in the r buckets within a previous time interval of the current time interval, where the r buckets are buckets to which the first object is mapped; and the processor 92 is configured to acquire variations of the r upper traffic limits according to the r upper traffic limits within the current time interval and the r upper traffic limits within the previous time interval; and when variations of r2 upper traffic limits in the variations of the r upper traffic limits are all greater than or equal to a third threshold, determine that the first object is a heavy changer, where r≥r2≥1.

Figure 10:
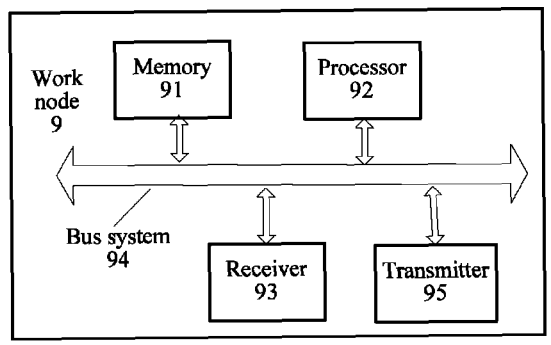
FIG. 10 is a schematic structural diagram of another work node according to an embodiment of the present invention.

Optionally, elements for the first object are distributed in d work nodes including the work node, where d is greater than or equal to 2, and d is an integer, the d work nodes obtain d abnormal object sets through identification, and each work node obtains one abnormal object set through identification; and the receiver 93 is further configured to receive (d−1) abnormal object sets sent by the other (d−1) work nodes, and when d1 abnormal object sets in the d abnormal object sets all include the first object, determine that the first object is a target abnormal object, where d≥d1≥1; or, as shown in FIG. 10, the work node 9 further includes a transmitter 95 configured to send, to a control node, an abnormal object set obtained through identification by the work node, so that when d2 abnormal object sets in the d abnormal object sets all include the first object, the control node determines that the first object is a target abnormal object, where d≥d2≥1.

Optionally, the processor 92 is configured to map any element for the first object in the Y elements to a first bucket according to the mapping algorithm, where the first bucket refers to any bucket to which the first object can be mapped according to the mapping algorithm; and the processor 92 is further configured to update record information included in the first bucket, where the record information includes total traffic of all elements mapped to the first bucket and an auxiliary queue, and the auxiliary queue is used to determine an upper traffic limit, of each object mapped to the first bucket, in the first bucket.

Optionally, the auxiliary queue is formed by total object traffic of objects mapped to the first bucket, a first element includes a traffic value v of the first object, and the first element is an element for the first object; and the processor 92 is configured to, when the auxiliary queue includes total object traffic of the first object, add v to a value of the total object traffic of the first object; or, when the auxiliary queue does not include total object traffic of the first object, add the total object traffic of the first object to the auxiliary queue, and assign v to the total object traffic of the first object.

Optionally, the auxiliary queue is formed by total object traffic of objects mapped to the first bucket, a first element includes a traffic value v of the first object, and the first element is an element for the first object; the record information further includes a maximum allowable capacity of the auxiliary queue; and the processor 92 is configured to, in a case in which a value of a current capacity of the auxiliary queue is less than a value of the maximum allowable capacity, when the auxiliary queue does not include total object traffic of the first object, add the total object traffic of the first object to the auxiliary queue, and assign v to the total object traffic of the first object.

Optionally, the record information further includes a maximum allowable capacity of the auxiliary queue, and a value of a current capacity of the auxiliary queue is greater than or equal to a value of the maximum allowable capacity of the auxiliary queue; and the processor 92 is further configured to, when the value of the maximum allowable capacity of the auxiliary queue meets a preset expansion condition, expand storage space corresponding to the value of the maximum allowable capacity to storage space corresponding to a value of an expanded capacity; and assign the value of the expanded capacity to the maximum allowable capacity.

Optionally, the auxiliary queue does not include total object traffic of the first object, the record information further includes a maximum allowable capacity of the auxiliary queue and an object traffic estimation error of the first bucket, a value of the maximum allowable capacity of the auxiliary queue does not meet a preset expansion condition, a first element includes a traffic value v of the first object, the first element is an element for the first object, and the object traffic estimation error of the first bucket is used to determine an upper traffic limit, of an object mapped to the first bucket, in the first bucket; and the processor 92 is further configured to determine a minimum value between v and a value of total object traffic of each object in the auxiliary queue; and the processor 92 is configured to subtract the minimum value from the value of the total object traffic of each object in the auxiliary queue, and add the minimum value to a value of the object traffic estimation error of the first bucket.

Optionally, the processor 92 is further configured to, when the auxiliary queue includes total object traffic having a value being zero, delete the total object traffic having a value being zero; add the total object traffic of the first object to the auxiliary queue; and assign v to the total object traffic of the first object.

Optionally, the processor 92 is further configured to, when the auxiliary queue does not include total object traffic having a value being zero, delete the first element.

Optionally, the processor 92 is further configured to determine whether a value L of the maximum allowable capacity of the auxiliary queue meets the preset expansion condition, and configured to determine a quantity k of rounds of current expansion; when (k+1)(k+2)−1>L, determine that the value of the maximum allowable capacity of the auxiliary queue meets the preset expansion condition; and when (k+1)(k+2)−1≤L, determine that the value of the maximum allowable capacity of the auxiliary queue does not meet the preset expansion condition, where the value of the expanded capacity is (k+1)(k+2)−1.

Optionally, the processor 92 is configured to determine the quantity k of rounds of current expansion according to a formula $$k = \frac{W}{T},$$

where W refers to total traffic, of all elements mapped to the first bucket, obtained after the first element is mapped to the first bucket; T refers to a dynamic expansion parameter; when the preset abnormal object type is a heavy hitter, T=ϕ; or, when the preset abnormal object type is a heavy changer, T=εϕ, where ϕ refers to a preset total object traffic threshold of the first object, ε is a constant, and 0<ε≤1.

Optionally, the first element is an element for the first object in the Y elements, and is the last element for the first object; and the processor 92 is configured to acquire an upper traffic limit of the first object in the first bucket, and configured to, when the total object traffic of the first object is in the auxiliary queue, use the value of the total object traffic of the first object as a lower traffic limit of the first object in the first bucket; and when the total object traffic of the first object is not in the auxiliary queue, use zero as a lower traffic limit of the first object in the first bucket; and use a sum of the lower traffic limit of the first object in the first bucket and the object traffic estimation error of the first bucket as the upper traffic limit of the first object in the first bucket.

Exemplarily, the work node 9 may be a device such as a server or a PC.

The work node provided by this embodiment of the present invention acquires a bucket as a target bucket, where total traffic of all elements mapped to the bucket within a current time interval is greater than or equal to a first threshold, and further identifies, according to a preset abnormal object type and r acquired upper traffic limits of a first object in r buckets, whether the object is an abnormal object, where the r buckets are buckets to which the first object is mapped, and the first object is any object mapped to the target bucket. In this solution, whether an object is an abnormal object is identified according to total traffic of all elements mapped to a bucket and an upper traffic limit of a single object in the mapped-to bucket, which can effectively avoid a problem in the prior art that because whether an object is an abnormal object is identified only using total traffic of all elements mapped to a bucket, some small-traffic objects are wrongly identified as heavy hitters, thereby improving identification accuracy.

Figure 11:
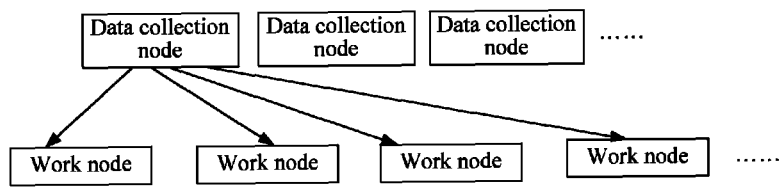
FIG. 11 is a block diagram of a system for identifying an abnormal IP data stream according to an embodiment of the present invention.
Figure 12:
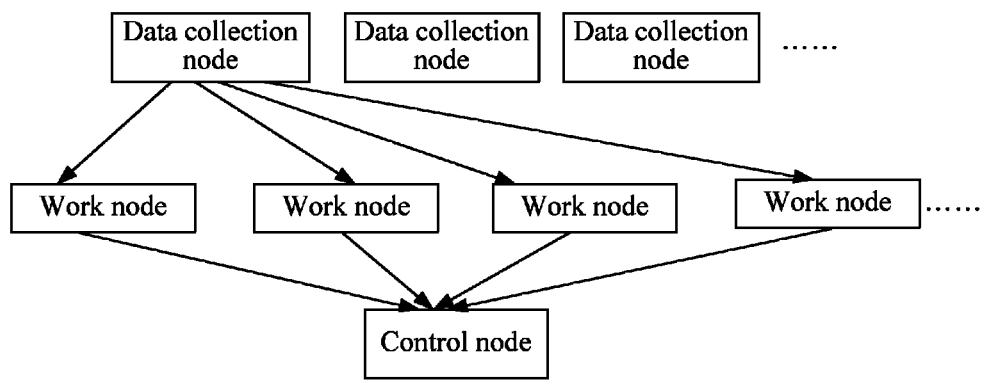
FIG. 12 is a block diagram of another system for identifying an abnormal IP data stream according to an embodiment of the present invention.

In addition, an embodiment of the present invention further provides a system for identifying an abnormal IP data stream, including one or more data collection nodes and one or more work nodes, where the work node may be the work node 7 or the work node 9 provided by the foregoing embodiments. It should be noted that, for the function of the data collection node or the work node and actions executed to implement the function, reference may be made to related parts of the foregoing embodiments, and details are not described herein again. FIG. 11 shows a block diagram of a system for identifying an abnormal IP data stream provided by an embodiment of the present invention. Optionally, as shown in FIG. 12, the system may further include a control node, where for the function of the control node and actions executed to implement the function, reference may be made to related parts of the foregoing embodiments, and details are not described herein again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided by this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the technical solutions of the embodiments of the present invention.

What is claimed is:

1. A method for identifying an abnormal Internet Protocol (IP) data stream, wherein the method is applied to a work node, and comprises:
   receiving, within a current time interval, Y elements sent by a data collection node, wherein Y is greater than or equal to 1, and wherein Y is an integer;
   mapping the Y elements to N buckets according to a mapping algorithm, wherein N is greater than or equal to 1, and wherein N is an integer;
   acquiring a target bucket of the N buckets as, wherein a total traffic of all elements that are mapped to the target bucket is greater than or equal to a first threshold, and wherein the target bucket includes elements associated with different IP data stream objects;
   acquiring r upper traffic limits of a first IP data stream object, of the different IP data stream objects, in r buckets within the current time interval, wherein the r buckets are buckets to which the first IP data stream object is mapped, wherein the first IP data stream object is any IP data stream object mapped to the target bucket, wherein each bucket in the r buckets comprises one upper traffic limit for the first IP data stream object, wherein r is greater than or equal to 1, and wherein r is an integer; and
   identifying, according to a preset abnormal object type and the r upper traffic limits within the current time interval, whether the first IP data stream object is an abnormal IP data stream object, wherein the preset abnormal object type is one of a heavy hitter type and a heavy changer type.

2. The method according to claim 1, wherein the preset abnormal object type is the heavy hitter type, wherein identifying, according to the preset abnormal object type and the r upper traffic limits within the current time interval, whether the first IP data stream object is an abnormal IP data stream object comprises determining that the first IP data stream object is a heavy hitter when r1 upper traffic limits in the r upper traffic limits within the current time interval are all greater than or equal to a second threshold, and wherein $r \geq r1 \geq 1$.

3. The method according to claim 1, wherein the preset abnormal object type is the heavy changer type, wherein the method further comprises acquiring r upper traffic limits of the first IP data stream object in the r buckets within a previous time interval of the current time interval, wherein the r buckets are buckets to which the first IP data stream object is mapped, wherein identifying, according to the preset abnormal object type and the r upper traffic limits within the current time interval, whether the first IP data stream object is an abnormal IP data stream object comprises:
   acquiring variations of the r upper traffic limits according to the r upper traffic limits within the current time interval and the r upper traffic limits within the previous time interval; and
   determining that the first IP data stream object is a heavy changer when variations of r2 upper traffic limits in the variations of the r upper traffic limits are all greater than or equal to a third threshold, and wherein $r \geq r2 \geq 1$.

4. The method according to claim 1, wherein elements for the first IP data stream object are distributed in d work nodes comprising the work node; wherein d is greater than or equal to 2, and d is an integer; wherein the d work nodes obtain d abnormal IP data stream object sets through identification; wherein each work node obtains one abnormal IP data stream object set through identification; and wherein, after identifying, according to the preset abnormal object type and the r upper traffic limits within the current time interval, whether the first IP data stream object is an abnormal object, the method further comprises one of:
   receiving (d−1) abnormal IP data stream object sets sent by the other (d−1) work nodes and, when d1 abnormal IP data stream object sets in the d abnormal object sets all comprise the first IP data stream object, determining that the first IP data stream object is a target abnormal object, wherein $d \geq d1 \geq 1$; and
   sending, to a control node, an abnormal IP data stream object set obtained through identification by the work node, such that when d2 abnormal IP data stream object sets in the d abnormal IP data stream object sets all comprise the first IP data stream object, the control node determines that the first IP data stream object is a target abnormal IP data stream object, and wherein d≥d2≥1.

5. The method according to claim 1, wherein mapping the Y elements to N buckets according to the mapping algorithm comprises mapping any element for the first IP data stream object in the Y elements to a first bucket according to the mapping algorithm, wherein the first bucket refers to any bucket to which the first IP data stream object can be mapped according to the mapping algorithm; and wherein the method further comprises updating record information in the first bucket, wherein the record information comprises total traffic of all elements mapped to the first bucket and an auxiliary queue, and wherein the auxiliary queue is used to determine an upper traffic limit, of each IP data stream object mapped to the first bucket, in the first bucket.

6. The method according to claim 5, wherein the auxiliary queue is formed by total object traffic of objects mapped to the first bucket, wherein a first element comprises a traffic value v of the first IP data stream object, wherein the first element is an element for the first IP data stream object, and wherein updating the record information in the first bucket comprises one of:
   adding v to a value of the total object traffic of the first IP data stream object when the auxiliary queue comprises total object traffic of the first IP data stream object; and
   adding the total object traffic of the first IP data stream object to the auxiliary queue and assigning v to the total object traffic of the first IP data stream object when the auxiliary queue does not comprise total object traffic of the first IP data stream object.

7. The method according to claim 5, wherein the auxiliary queue is formed by total object traffic of IP data stream objects mapped to the first bucket; wherein a first element comprises a traffic value v of the first IP data stream object; wherein the first element is an element for the first IP data stream object, wherein the record information further comprises a maximum allowable capacity of the auxiliary queue, and wherein in a case in which a value of a current capacity of the auxiliary queue is less than a value of the maximum allowable capacity and when the auxiliary queue does not comprise total object traffic of the first IP data stream object, updating the record information in the first bucket comprises:
   adding the total object traffic of the first IP data stream object to the auxiliary queue; and
   assigning v to the total object traffic of the first IP data stream object.

8. The method according to claim 6, wherein the record information further comprises a maximum allowable capacity of the auxiliary queue; wherein a value of a current capacity of the auxiliary queue is greater than or equal to a value of the maximum allowable capacity of the auxiliary queue, wherein, before the adding of the total object traffic of the first IP data stream object to the auxiliary queue, the method further comprises expanding storage space corresponding to the value of the maximum allowable capacity to storage space corresponding to a value of an expanded capacity when the value of the maximum allowable capacity of the auxiliary queue meets a preset expansion condition, and wherein updating the record information in the first bucket further comprises assigning the value of the expanded capacity to the maximum allowable capacity.

9. The method according to claim 5, wherein the auxiliary queue does not comprise the total object traffic of the first IP data stream object; wherein the record information further comprises a maximum allowable capacity of the auxiliary queue and an object traffic estimation error of the first bucket; wherein a value of the maximum allowable capacity of the auxiliary queue does not meet a preset expansion condition; wherein a first element comprises a traffic value v of the first IP data stream object; wherein the first element is an element for the first IP data stream object; wherein the object traffic estimation error of the first bucket is used to determine an upper traffic limit, of an IP data stream object mapped to the first bucket, in the first bucket, wherein before the updating of the record information in the first bucket, the method further comprises determining a minimum value between v and a value of total object traffic of each IP data stream object in the auxiliary queue, and wherein updating the record information in the first bucket comprises:
   subtracting the minimum value from the value of the total object traffic of each IP data stream object in the auxiliary queue; and
   adding the minimum value to a value of the object traffic estimation error of the first bucket.

10. The method according to claim 9, wherein, when the auxiliary queue comprises total object traffic having a value being zero, updating the record information in the first bucket further comprises:
   deleting the total object traffic having a value being zero;
   adding the total object traffic of the first IP data stream object to the auxiliary queue; and
   assigning v to the total object traffic of the first IP data stream object.

11. The method according to claim 9, wherein, when the auxiliary queue does not comprise total object traffic having a value being zero, the method further comprises deleting the first element.

12. The method according to claim 8, wherein the method further comprises determining whether a value L of the maximum allowable capacity of the auxiliary queue meets the preset expansion condition, which comprises:
   determining a quantity k of rounds of current expansion;
   determining that the value of the maximum allowable capacity of the auxiliary queue meets the preset expansion condition when (k+1)(k+2)−1>L; and
   determining that the value of the maximum allowable capacity of the auxiliary queue does not meet the preset expansion condition when (k+1)(k+2)−1≤L, and
   wherein the value of the expanded capacity is (k+1)(k+2)−1.

13. The method according to claim 12, wherein determining the quantity k of rounds of current expansion comprises determining the quantity k of rounds of current expansion according to a formula $$k = \frac{W}{T},$$

wherein W refers to total traffic of all elements mapped to the first bucket and obtained after the first element is mapped to the first bucket, wherein T refers to a dynamic expansion parameter, wherein T=φ when the preset abnormal object type is the heavy hitter type, wherein T=εφ when the preset abnormal object type is the heavy changer type, wherein φ refers to a preset total object traffic threshold of the first IP data stream object, wherein ε is a constant, and wherein 0<ε≤1.

14. The method according to claim 9, wherein the first element is an element for the first IP data stream object in the Y elements and is the last element for the first IP data stream object, wherein acquiring of the r upper traffic limits comprises acquiring an upper traffic limit of the first IP data stream object in the first bucket, and wherein acquiring the upper traffic limit of the first IP data stream object in the first bucket further comprises:
   using the value of the total object traffic of the first IP data stream object as a lower traffic limit of the first IP data stream object in the first bucket when the total object traffic of the first IP data stream object is in the auxiliary queue;
   using zero as a lower traffic limit of the first IP data stream object in the first bucket when the total object traffic of the first IP data stream object is not in the auxiliary queue; and
   using a sum of the lower traffic limit of the first IP data stream object in the first bucket and the object traffic estimation error of the first bucket as the upper traffic limit of the first IP data stream object in the first bucket.

15. A work node for identifying an abnormal Internet Protocol (IP) data stream, comprising:
   a receiver configured to receive, within a current time interval, Y elements sent by a data collection node, wherein Y is greater than or equal to 1, and wherein Y is an integer; and
   a processor configured to:
      map the Y elements to N buckets according to a mapping algorithm, wherein N is greater than or equal to 1, and wherein N is an integer;
      a target bucket of the N buckets, wherein a total traffic of all elements that are mapped to the target bucket is greater than or equal to a first threshold, wherein the target bucket includes elements associated with different IP data stream objects;
      acquire r upper traffic limits of a first IP data stream object, of the different IP data stream objects, in r buckets within the current time interval, wherein the r buckets are buckets to which the first IP data stream object is mapped, wherein the first IP data stream object is any IP data stream object mapped to the target bucket, wherein each bucket in the r buckets comprises one upper traffic limit for the first IP data stream object, wherein r is greater than or equal to 1, and wherein r is an integer; and
      identify, according to a preset abnormal object type and the r upper traffic limits within the current time interval, whether the first IP data stream object is an abnormal IP data stream object, wherein the preset abnormal object type is one of a heavy hitter type and a heavy changer type.

16. The work node according to claim 15, wherein the preset abnormal object type is the heavy hitter type, wherein the processor is configured to determine that the first IP data stream object is a heavy hitter when r1 upper traffic limits in the r upper traffic limits within the current time interval are all greater than or equal to a second threshold, and wherein $r \geq r1 \geq 1$.

17. The work node according to claim 15, wherein the preset abnormal object type is the heavy changer type, wherein the processor is further configured to acquire r upper traffic limits of the first IP data stream object in the r buckets within a previous time interval of the current time interval, wherein the r buckets are buckets to which the first IP data stream object is mapped, and wherein the processor is configured to:
   acquire variations of the r upper traffic limits according to the r upper traffic limits within the current time interval and the r upper traffic limits within the previous time interval; and
   determine that the first IP data stream object is a heavy changer when variations of r2 upper traffic limits in the variations of the r upper traffic limits are all greater than or equal to a third threshold, and wherein $r \geq r2 \geq 1$.

18. The work node according to claim 15, wherein elements for the first IP data stream object are distributed in d work nodes comprising the work node, wherein d is greater than or equal to 2, wherein d is an integer, wherein the d work nodes obtain d abnormal IP data stream object sets through identification, wherein each work node obtains one abnormal IP data stream object set through identification, wherein the receiver is further configured to:
   receive (d−1) abnormal IP data stream object sets sent by the other (d−1) work nodes; and
   determine that the first IP data stream object is a target abnormal object when d1 abnormal IP data stream object sets in the d abnormal IP data stream object sets all comprise the first IP data stream object, wherein $d \geq d1 \geq 1$,
wherein the work node further comprises a transmitter configured to send, to a control node, an abnormal IP data stream object set obtained through identification by the work node such that when d2 abnormal IP data stream object sets in the d abnormal IP data stream object sets all comprise the first IP data stream object, the control node determines that the first IP data stream object is a target abnormal IP data stream object, and wherein $d \geq d2 \geq 1$.

19. The work node according to claim 15, wherein the processor is configured to map any element for the first IP data stream object in the Y elements to a first bucket according to the mapping algorithm, wherein the first bucket refers to any bucket to which the first IP data stream object can be mapped according to the mapping algorithm, wherein the processor is further configured to update record information in the first bucket, wherein the record information comprises total traffic of all elements mapped to the first bucket and an auxiliary queue, and wherein the auxiliary queue is used to determine an upper traffic limit, of each IP data stream object mapped to the first bucket, in the first bucket.

20. The work node according to claim 19, wherein the auxiliary queue is formed by total object traffic of IP data stream objects mapped to the first bucket, wherein a first element comprises a traffic value v of the first IP data stream object, and wherein the first element is an element for the first IP data stream object, and wherein the processor is configured to:
   add v to a value of the total object traffic of the first IP data stream object when the auxiliary queue comprises total object traffic of the first IP data stream object; and
   add the total object traffic of the first IP data stream object to the auxiliary queue and assign v to the total object traffic of the first IP data stream object when the auxiliary queue does not comprise total object traffic of the first IP data stream object.

21. The work node according to claim 19, wherein the auxiliary queue is formed by total object traffic of objects mapped to the first bucket, wherein a first element comprises a traffic value v of the first IP data stream object, wherein the first element is an element for the first IP data stream object, wherein the record information further comprises a maximum allowable capacity of the auxiliary queue, and wherein the processor is configured to:
  add the total object traffic of the first IP data stream object to the auxiliary queue in a case in which a value of a current capacity of the auxiliary queue is less than a value of the maximum allowable capacity and when the auxiliary queue does not comprise total object traffic of the first IP data stream object; and
  assign v to the total object traffic of the first IP data stream object.

22. The work node according to claim 20, wherein the record information further comprises a maximum allowable capacity of the auxiliary queue, wherein a value of a current capacity of the auxiliary queue is greater than or equal to a value of the maximum allowable capacity of the auxiliary queue, wherein the processor is further configured to expand storage space corresponding to the value of the maximum allowable capacity to storage space corresponding to a value of an expanded capacity when the value of the maximum allowable capacity of the auxiliary queue meets a preset expansion condition, and wherein the processor is configured to assign the value of the expanded capacity to the maximum allowable capacity.

23. The work node according to claim 19, wherein the auxiliary queue does not comprise the total object traffic of the first IP data stream object, wherein the record information further comprises a maximum allowable capacity of the auxiliary queue and an object traffic estimation error of the first bucket, wherein a value of the maximum allowable capacity of the auxiliary queue does not meet a preset expansion condition, wherein a first element comprises a traffic value v of the first IP data stream object, wherein the first element is an element for the first IP data stream object, wherein the object traffic estimation error of the first bucket is used to determine an upper traffic limit, of an IP data stream object mapped to the first bucket, in the first bucket, and wherein the processor is further configured to determine a minimum value between v and a value of total object traffic of each IP data stream object in the auxiliary queue, and wherein the processor is configured to:
  subtract the minimum value from the value of the total object traffic of each IP data stream object in the auxiliary queue; and
  add the minimum value to a value of the object traffic estimation error of the first bucket.

24. The work node according to claim 23, wherein when the auxiliary queue comprises total object traffic having a value being zero, the processor is further configured to:
  delete the total object traffic having a value being zero;
  add the total object traffic of the first IP data stream object to the auxiliary queue; and
  assign v to the total object traffic of the first IP data stream object.

25. The work node according to claim 23, wherein the processor is further configured to delete the first element when the auxiliary queue does not comprise total object traffic having a value being zero.

26. The work node according to claim 22, wherein the processor is further configured to determine whether a value L of the maximum allowable capacity of the auxiliary queue meets the preset expansion condition, and further configured to:
  determine a quantity k of rounds of current expansion;
  determine that the value of the maximum allowable capacity of the auxiliary queue meets the preset expansion condition when $(k+1)(k+2)-1 > L$; and
  determine that the value of the maximum allowable capacity of the auxiliary queue does not meet the preset expansion condition when $(k+1)(k+2)-1 \leq L$, and
  wherein the value of the expanded capacity is $(k+1)(k+2)-1$.

27. The work node according to claim 26, wherein the processor is configured to determine the quantity k of rounds of current expansion according to a formula $$k = \frac{W}{T},$$

wherein W refers to total traffic, of all elements mapped to the first bucket, obtained after the first element is mapped to the first bucket, wherein T refers to a dynamic expansion parameter; wherein $T=\phi$ when the preset abnormal object type is the heavy hitter type, wherein $T=\epsilon\phi$ when the preset abnormal object type is the heavy changer type, wherein $\phi$ refers to a preset total object traffic threshold of the first IP data stream object, $\epsilon$ is a constant, and wherein $0<\epsilon\leq 1$.

28. The work node according to claim 23, wherein the first element is an element for the first IP data stream object in the Y elements and is the last element for the first IP data stream object, and wherein the processor is configured to acquire an upper traffic limit of the first IP data stream object in the first bucket, wherein acquiring the upper traffic limit comprises:
  using the value of the total object traffic of the first IP data stream object as a lower traffic limit of the first IP data stream object in the first bucket when the total object traffic of the first IP data stream object is in the auxiliary queue and using zero as a lower traffic limit of the first IP data stream object in the first bucket when the total object traffic of the first IP data stream object is not in the auxiliary queue; and
  using a sum of the lower traffic limit of the first IP data stream object in the first bucket and the object traffic estimation error of the first bucket as the upper traffic limit of the first IP data stream object in the first bucket.

29. A system for identifying an abnormal Internet Protocol (IP) data stream, comprising a data collection node and a work node, wherein the data collection node is configured to send Y elements, and wherein the work node comprises:
  a receiver configured to receive, within a current time interval, Y elements sent by the data collection node, wherein Y is greater than or equal to 1, and wherein Y is an integer; and
  a processor configured to:
    map the Y elements to N buckets according to a mapping algorithm, wherein N is greater than or equal to 1, and wherein N is an integer;
    a target bucket of the N buckets, wherein a total traffic of all elements that are mapped to the target bucket is greater than or equal to a first threshold, wherein the target bucket includes elements associated with different IP data stream objects;
    acquire r upper traffic limits of a first IP data stream object, of the different IP data stream objects, in r buckets within the current time interval, wherein the r buckets are buckets to which the first IP data stream object is mapped, wherein the first IP data stream object is any IP data stream object mapped to the target bucket, wherein each bucket in the r buckets comprises one upper traffic limit for the first IP data stream object, wherein r is greater than or equal to 1, and wherein r is an integer; and identify, according to a preset abnormal object type and the r upper traffic limits within the current time interval, whether the first IP data stream object is an abnormal IP data stream object, wherein the preset abnormal object type is one of a heavy hitter and a heavy changer.

* * * * *

UNITED STATES PATENT AND TRADEMARK OFFICE
CERTIFICATE OF CORRECTION

PATENT NO. : 9,923,794 B2
APPLICATION NO. : 14/798811
DATED : March 20, 2018
INVENTOR(S) : Cheng He, Qun Huang and Pak-Ching Lee It is certified that error appears in the above-identified patent and that said Letters Patent is hereby corrected as shown below:

In the Claims

Column 29; Line 61; Claim 1 should read:
acquiring a target bucket of the N buckets, wherein a Column 34; Line 16; Claim 18 should read:
abnormal IP data stream object set through identification, Signed and Sealed this
Fifth Day of June, 2018

Andrei Iancu
*Director of the United States Patent and Trademark Office*